United States Patent [19]
Bogner et al.

[11] Patent Number: 5,680,445
[45] Date of Patent: *Oct. 21, 1997

[54] CONDITION RESPONSIVE INDICATING SYSTEM FOR INTERACTIVELY INDICATING STATUS OF A PLURALITY OF ELECTRICAL APPLIANCES

[75] Inventors: Douglas J. Bogner; Jason H. Mernick, both of Los Angeles, Calif.

[73] Assignee: Advanced Laundry Devices, Santa Monica, Calif.

[*] Notice: The portion of the term of this patent subsequent to Dec. 17, 2013, has been disclaimed.

[21] Appl. No.: 706,994

[22] Filed: Sep. 3, 1996

Related U.S. Application Data

[63] Continuation of Ser. No. 451,020, May 25, 1995, Pat. No. 5,586,174, which is a continuation-in-part of Ser. No. 160,440, Dec. 1, 1993, abandoned, which is a continuation-in-part of Ser. No. 746,223, Aug. 15, 1991, abandoned, which is a continuation-in-part of Ser. No. 567,964, Aug. 15, 1990, abandoned.

[51] Int. Cl.⁶ ............................................. H04M 11/00
[52] U.S. Cl. ........................ 379/106; 340/533; 340/679
[58] Field of Search ........................... 379/102, 104–107, 379/92, 93, 90, 110; 340/310.06, 310.08, 310.02, 533, 539, 310.01, 679; 307/31, 38, 40

[56] References Cited

U.S. PATENT DOCUMENTS 5,586,174  12/1996  Bogner et al. ........................ 379/106

*Primary Examiner*—Wing F. Chan
*Attorney, Agent, or Firm*—Oppenheimer Poms Smith

[57] ABSTRACT

The operating status of a plurality of laundry appliances including washing machines and/or driers is sensed, and a controller generates and transmits corresponding status signals to remote transceivers which include visual or audio indicators for indicating the information. Each transceiver can interrogate the controller to determine the status of the appliances, with the status being transmitted only to the interrogating transmitter. Each transceiver can also transmit a reservation signal to the controller to reserve a selected appliance for a predetermined period of time. The controller also transmits status signals for the selected appliance only to the transceiver of the user who reserved the appliance when the operating cycle is finished, or at a predetermined period of time prior to the end of the operating cycle. The transceivers can communicate with the controller over a telephone line, or over A.C. power lines.

12 Claims, 33 Drawing Sheets

5,680,445

CONDITION RESPONSIVE INDICATING SYSTEM FOR INTERACTIVELY INDICATING STATUS OF A PLURALITY OF ELECTRICAL APPLIANCES

This application is a continuation of U.S. patent application Ser. No. 08/451,020, filed May 25, 1995, now U.S. Pat. No. 5,586,174 which is a CIP of Ser. No. 08/160,440, filed Dec. 1, 1993, now abandoned; which is a CIP of Ser. No. 07/746,223, filed Aug. 15, 1991, now abandoned; which is a CIP of Ser. No. 07/567,964, filed Aug. 15, 1990, now abandoned.

FIELD OF THE INVENTION

The present invention generally relates to the field of condition responsive indicating systems, and more specifically, to a system for interactively indicating the status of a plurality of electrical appliances such as laundry washing and drying machines.

BACKGROUND OF THE INVENTION

In multiple unit living quarters, such as condominiums and apartment complexes using a common utility facility, it is valuable for occupants of the individual condominiums, apartments, and dormitories to be aware of the availability and status of the commonly shared laundry appliances.

Many different techniques for monitoring the status of appliances, such as laundry appliances and cooking appliances, are known. The appliances can be monitored at a remote location and, in some cases, can be controlled from the remote location. Systems are also known for transmitting the status or control signals between the appliances and the status or control by radio frequency or by signals along the power mains.

One problem in monitoring the status of appliances arises from the need to have multiple and relatively complex sensing means associated or fitted with the appliance. Another problem concerns the present inability of conventional monitoring schemes to allow substantial interactive communication and control capabilities with the remotely located appliances.

U.S. Pat. No. 4,916,439, entitled "REMOTE DISPLAY ARRANGEMENT FOR APPLIANCES", issued Apr. 10, 1990 to Bay Estes et al., discloses a sensor for sensing the operational status of a laundry appliance, such as a washing machine or dryer, and transmitting the status to a receiver in the form of a modified wristwatch via radio waves. This arrangement links only one appliance to one receiver, and does not enable the user to interactively control the appliance.

U.S. Pat. No. 5,089,809, entitled "REMOTE INDICATION OF APPLIANCE STATUS", issued Feb. 18, 1992 to Raymond Carmichael, Jr., discloses an arrangement of sensors for sensing the operational status of a plurality of laundry appliances, and broadcasting the status to a plurality of receivers in parallel. This arrangement similarly lacks interactive control capabilities.

There is a need to provide for this interactive capability and convenience, and the present invention seeks to fulfill that need.

SUMMARY OF THE INVENTION

In a condition responsive indicating system for interactively indicating the status of a plurality of electrical appliances embodying the present invention, the operating status of a plurality of laundry appliances, including washing machines and driers, is sensed, and a controller generates and transmits corresponding status signals to remote transceivers which include visual and/or audio indicators for indicating the information.

Each transceiver can interrogate the controller to determine the status of the appliances, with the status being transmitted preferably only to the interrogating transmitter. Each transceiver can also transmit a reservation signal to the controller to reserve a selected appliance for a predetermined period of time.

The controller also transmits status signals for the selected appliances preferably only to the transceiver of the user who reserved the appliance, when the operating cycle is finished, or at a predetermined period of time prior to the end of the operating cycle. The transceivers can communicate with the controller over a telephone line, or over A.C. power lines.

According to the invention, there is provided a system apparatus and method for remotely indicating the status of multiple appliances or units grouped in at least one area or multiple areas to multiple discrete different receiving remote locations. The appliances or units are connected to a power supply and each appliance or unit is in associated proximity to each other and is contained in a first location. The receiving locations are preferably connected through the power lines or by a telephone system through a controller with the first location. Although the system is described with reference to appliances in the nature of laundry appliances, the scope of the application of the system extends broadly to other power consuming units.

Detection means electrically connected to the appliances detects the status of the appliances and generates representative status signals. Encoding means electrically connects the detection means for receiving the status signals and encodes the signals for transmission. The detection means for multiple appliances is collectively centrally set up in a unitary structure which senses current to each of the appliances. Preferably, the unitary structure is in the wall outlet socket for connecting power to the appliances.

In one preferred form of the invention, a system for remotely sensing multiple variable power consuming devices comprises means responsive to the status condition of each device. The status is determined selectively by a measure of an operational signal parameter applicable to each variable device.

A controller receives the operational signal parameter, the controller having means for communication with the multiple remote transceiver means. Multiple transceiver means are capable of communicating data between the transceiver means and the controller. The status of at least one power consuming device can thus be transmitted to the transceiver.

In another embodiment of the invention, transmission means electrically-connected to the signal encoding means modulates and transmits the encoded signals over power lines connected to the alternating current power supply. The receiving means receives and demodulates the transmitted signals received over the alternating current power lines so as to indicate the status of selected appliances at selected receiving locations. In yet another embodiment of the present invention, the encoded signals are transmitted over telephone lines.

There are means for associating selected appliances with selected receiving locations thereby to indicate the status of selected appliances to selected receiving locations. Selected appliances may be located in one or more common utility rooms for multiple living quarters, which may be condominiums, apartments, flats, townhouses or dormitories, for example.

Also, in a preferred form of the invention, selected receiving locations can signal selected appliances at the first location whereby selected receiving locations are linked with selected appliances for a predetermined time period. Means are provided at the first location to confirm the link. In this manner, the receiving means include means for transmitting a signal to the transmitting means, and the transmitting means includes means for receiving the signal. Such signal is communicated along the power lines or the telephone lines.

The invention is now further described with reference to the accompanying drawings and description. Further aspects of the invention will be apparent from the drawings and description.

BRIEF DESCRIPTION OF THE DRAWINGS

FIG. 10 represents two such comparators;

DETAILED DESCRIPTION OF THE PREFERRED EMBODIMENTS

Figure 1:
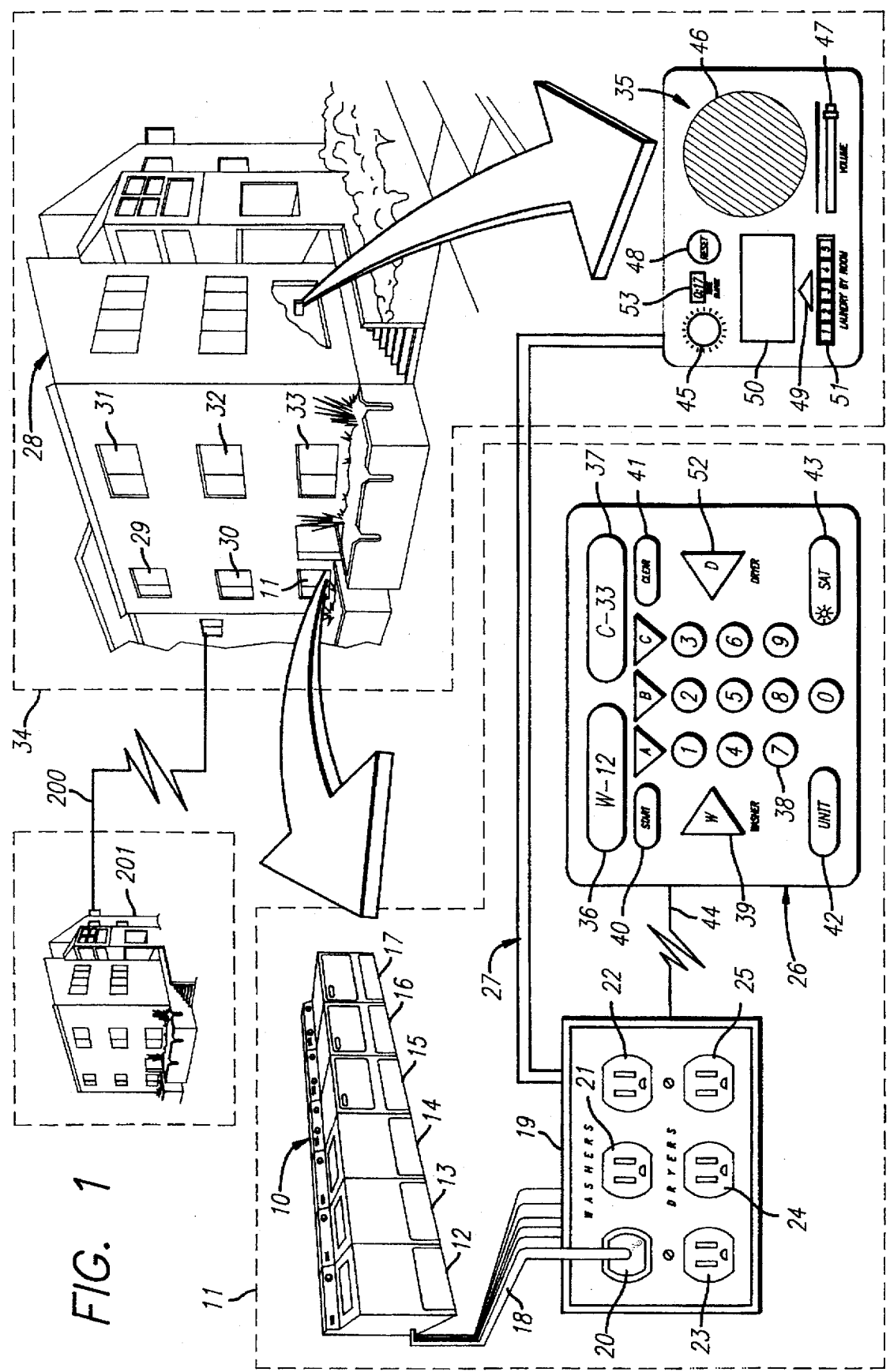
FIG. 1 is a diagrammatic perspective illustration indicating a first location and a second location, and the main component elements in the first location and the receiving locations.

A system which includes an apparatus and a method for indicating the status of laundry appliances, generally indicated by 10, is located in a first location 11. The appliances 10 are preferably washers 12, 13 and 14, and dryers 15, 16 and 17. The appliances are associated in proximity to each other and are contained in the first location 11. The appliances are connected to an alternating current power supply collectively indicated by the cable system 18, the outlet being indicated by plate 19. Current sensors are located in plate 19. Each outlet 20, 21 and 22 are associated with a respective washer, and outlets 23, 24 and 25 are associated with a respective dryer. The washers are preferably connected as follows: washer 12 to outlet 20, washer 13 to outlet 21, and washer 14 to outlet 22. The dryers are preferably connected as follows: dryer 15 to outlet 23, dryer 16 to outlet 24, and dryer 17 to outlet 25.

Also, in the first location 11, there is located a programmable outgoing signal unit 26 which includes detection means electrically connected to appliances 12 through 17 for detecting the status of the appliances 12 through 17 and generating respective status signals. The detection means includes a current sensor responsive to current for each of appliances 12 through 17. The current sensors are integrally contained and constructed together with other transmitter elements so as to be mounted together with outlet plate 19. The programmable outgoing signal unit 26 also includes means for encoding signals for subsequent transmission on the AC power lines 27 connected with the outlet at plate 19. The encoding means is electrically connected to the detection means and encodes the status signal for transmission along the AC power line 27.

At a discrete receiving location, such as a condominium complex 28, there are receiving means connected in each of the living units 29, 30, 31, 32 and 33 which are illustrated diagrammatically. In the condominium complex 28, the first location 11 is indicated as a laundry or utility room 11 and is not diagrammatically illustrated within the receiving location 34. Inside the unit 33, for example, there is a receiving signal box 35 which includes means for receiving and demodulating transmitted signals received through power line 27. The receiver means includes decoder means for decoding the encoding signals and means by which associated selected appliances 12 through 17 can be connected with each of the respective receiving locations 29, 30, 31, 32 or 33 as indicated. In this manner, each of these respective receiving locations 29 through 33 can be alerted to the status of respective appliances 12 through 17 in a common utility or laundry room 11 in the condominium complex 28.

In different cases, there can be a common utility room 11 separated from the complex 28. Alternatively, there can be multiple utility rooms 11 for a group of living quarters. Further, the system can provide selectivity to connect different utility rooms with different selected living quarters.

The programmable outgoing signal box 26 in the common utility room 11 has means for connecting, for example, washer 12 with condominium 33. A window 36 in the programmable outgoing signal box 26 indicates washer 12, and window 37 indicates condominium 33. A keyboard 38, illustrated on the face of the box 26, is a means for indicating or connecting a particular appliance with a condominium. A washer key button 39 can be operated to connect a suitable washer, and a dryer key button 52 can be operated to connect a suitable dryer. Other operative buttons include the start button 40, clear button 41, unit button 42 and set button 43.

The box 26 is connected to the wall outlet 19 as indicated by line 44. The various appliances are connected by the outlet 19 as indicated by sockets through 25, and the detection means inside box 19 can indicate, through the current being drawn on the respective outlets, the status of each one of the appliances 12 through 17 which is transmitted to the box 26. The transmission from box 26 is effected along the power supply cable 27 to the receiving box 35, located for example, in condominium 33.

The receiving box 35 includes a visual display 45, which may be a light, for example, for indicating the status of the linked washer 12. Selectively, an audible outlet 46, which may be controlled by a chime, gong or voice chip, can be provided in the outlet box 35. A volume control switch 47 may also be provided. Means for resetting the system may be effected through box 35 as indicated by button 48. A button 49, a window 50 (LCD, LED, or plasma screen) and a switch 51 may also be included on box 35. The user, prior to proceeding to the laundry area, can actuate switch 51 to select the laundry area 11. The user may then press button 49 and in window 50 will be displayed the availability of appliances in the selected area, preferably in the form of a visual message. For example, the user may see the message "2 washers and 2 driers available" or "All machines currently in use." Alternatively, appliance status information may be broadcasted to the user. If the user finds that the selected area 11 is unavailable, the user can then actuate switch 51 to select another location to check the availability of appliances in that area. The user may also be presented with the remaining elapsed time for a selected appliance via display 53.

The communication along the power cables 27 is effected by selective modulation means which could be amplitude modulation, frequency modulation or phase modulation. In other cases, the system may communicate through radio frequency modulation instead of an AC power supply system. A suitable transmission wavelength can be selected.

The receiver box 35 is connected to the AC power outlet in the receiving location, such as condominium 33. This connection can be effected-through a plug and socket system or the receiver can be wired into place. By providing multiple receiver boxes 35 to each of the respective receiving locations 29 through 33, the present invention provides an easy way of communicating between the utility room 11 and the respective condominium units. The preferred system for modulating the signal on the power lines 27 is a frequency modulated system based on a Frequency Shift Keyed (FSK) format.

The transmission means operates in a broadcast mode sending digital data over a power line to receivers 35 attached to the same power line. The range of operation is expected to be localized to all outlets connected within the same power transformer circuit. Within the transmitter unit 26, there is provided a current sensor which converts an operational parameter, preferably a current, indicative of the state (on or off) of the appliances, 12 through 17, into a digital signal. Parallel digital data, preferably organized as a packet of seven or eight bits, is multiplexed into serial form which modulates a sine wave in accordance to the FSK format. This signal is converted into a form of a current by amplifiers, and transmitted through the power lines 27. Appropriate impedance matching is effected between the output of box 26 and the input to the power lines 27.

The receiver box 35 includes a high pass and a band pass filter network to maximize the energy of the received signal transmitted along the power supply lines 27. As such, the band noise is effectively minimized. A phase-locked-loop receiver is used to demodulate the FSK signal into serial data. The serial data is demultiplexed back into parallel data representative of each one of the appliances. A Universal Asynchronous Receiver Transmitter circuit (UART) is used in effecting the conversion.

Each of the signal boxes is also provided with a receiver whereby signals can be received along the AC power lines when transmitted from respective boxes 35. In this embodiment, the units 35 would be provided with a suitable input keyboard similar to that provided in the box 26, and the signal would be transmitted from box 35 and returned to box 26 in a manner similar to the signals that are transmitted from box 26 to 35. In other words, the transmission system in unit 35 would essentially be parallel to the transmission system in unit 26. In unit 26, the receiving system would essentially be parallel to the receiving system in box 35. The receiver in box 26, however, would be designed to link selected washer and dryer units with a selected condominium. In this manner, a select condominium 33, for instance, can reserve for a predetermined time period, a washer and dryer. Accordingly, an occupant from the condominium can then have a predetermined time, such as five or ten minutes, to go from a condominium to the utility room and activate the washer and dryer. When such washer and dryer is activated, the unit 26 will transmit appliance status information to unit 35.

Figure 2:
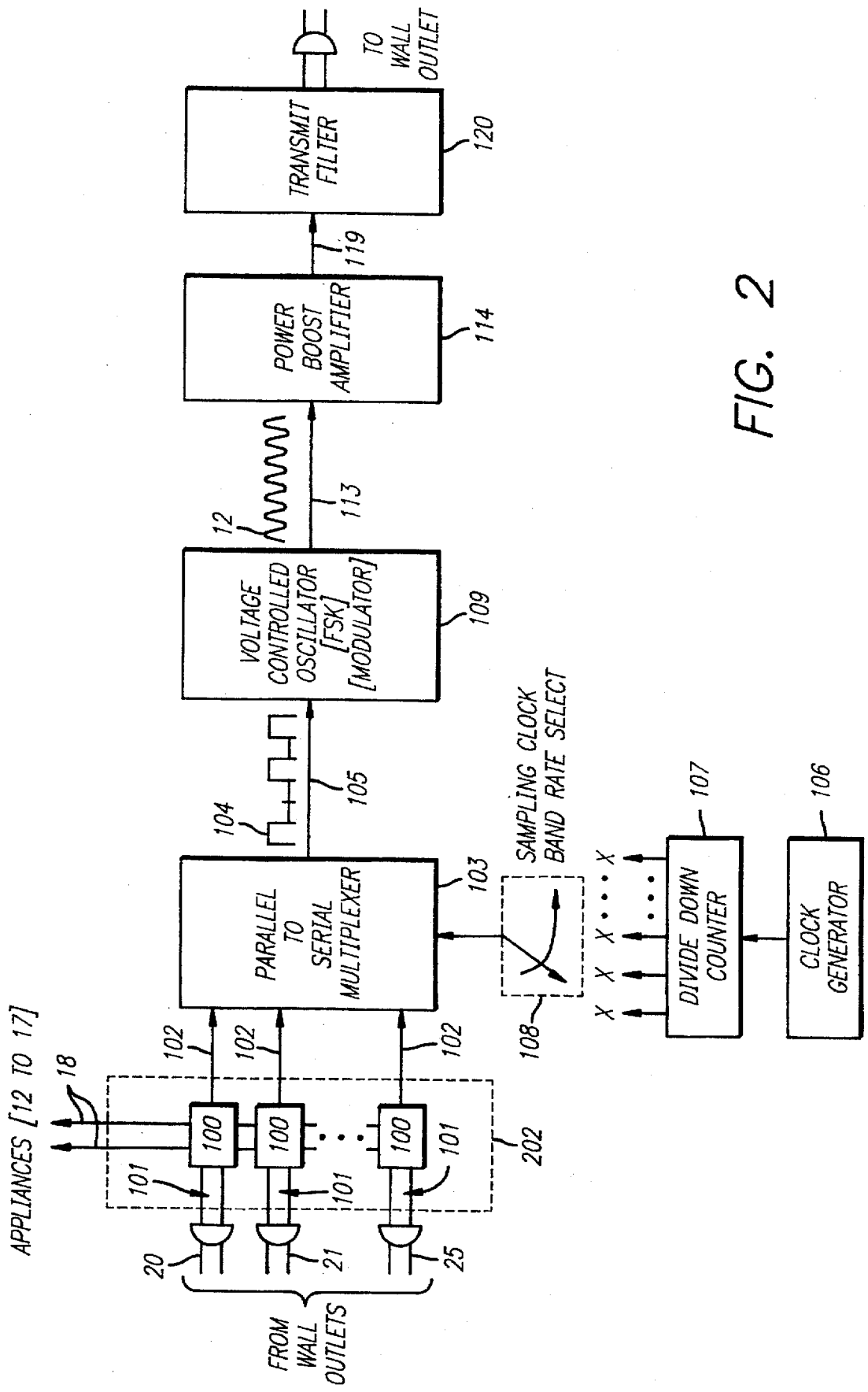
FIG. 2 is a block diagram illustrating the main components of the means for transmitting the outgoing signal from the first location.
Figure 3:
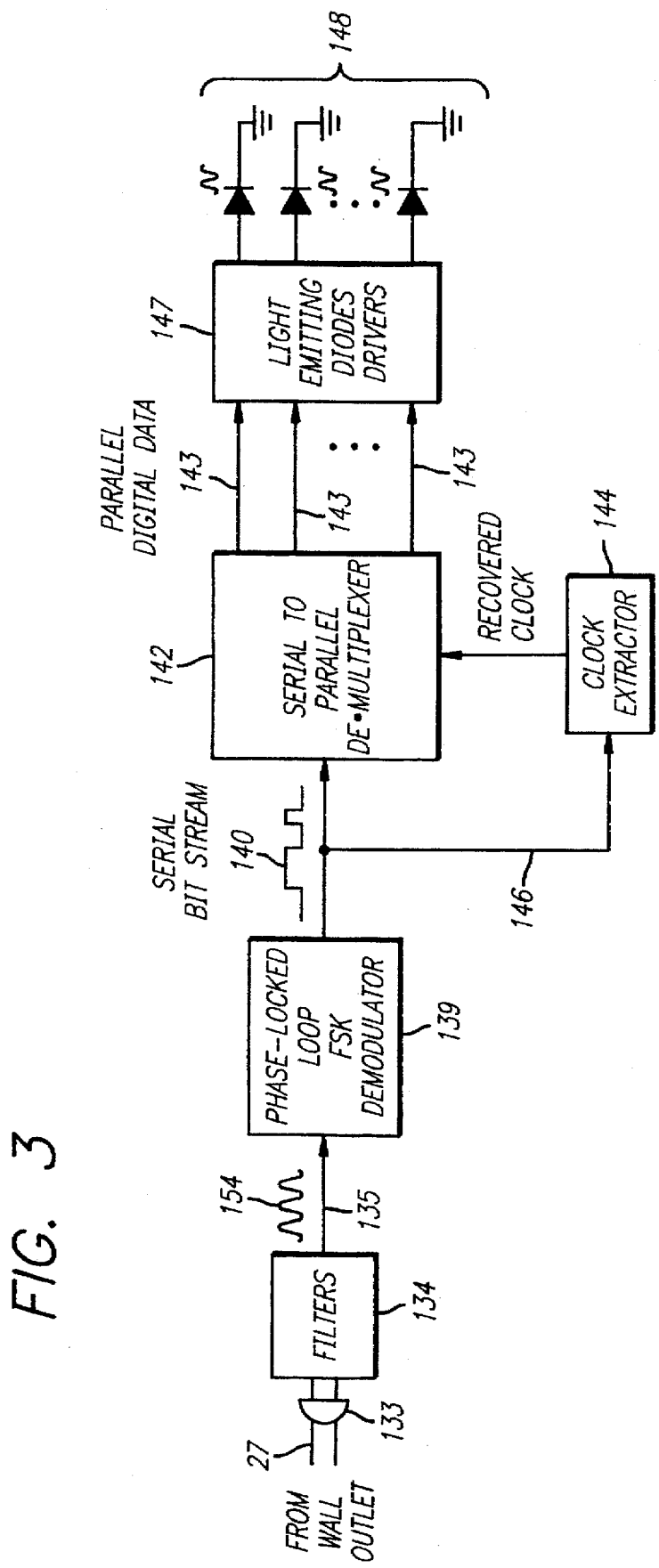
FIG. 3 is a block diagram illustration of the receiving means at the receiving location receiving the transmitted signal.
Figure 4:
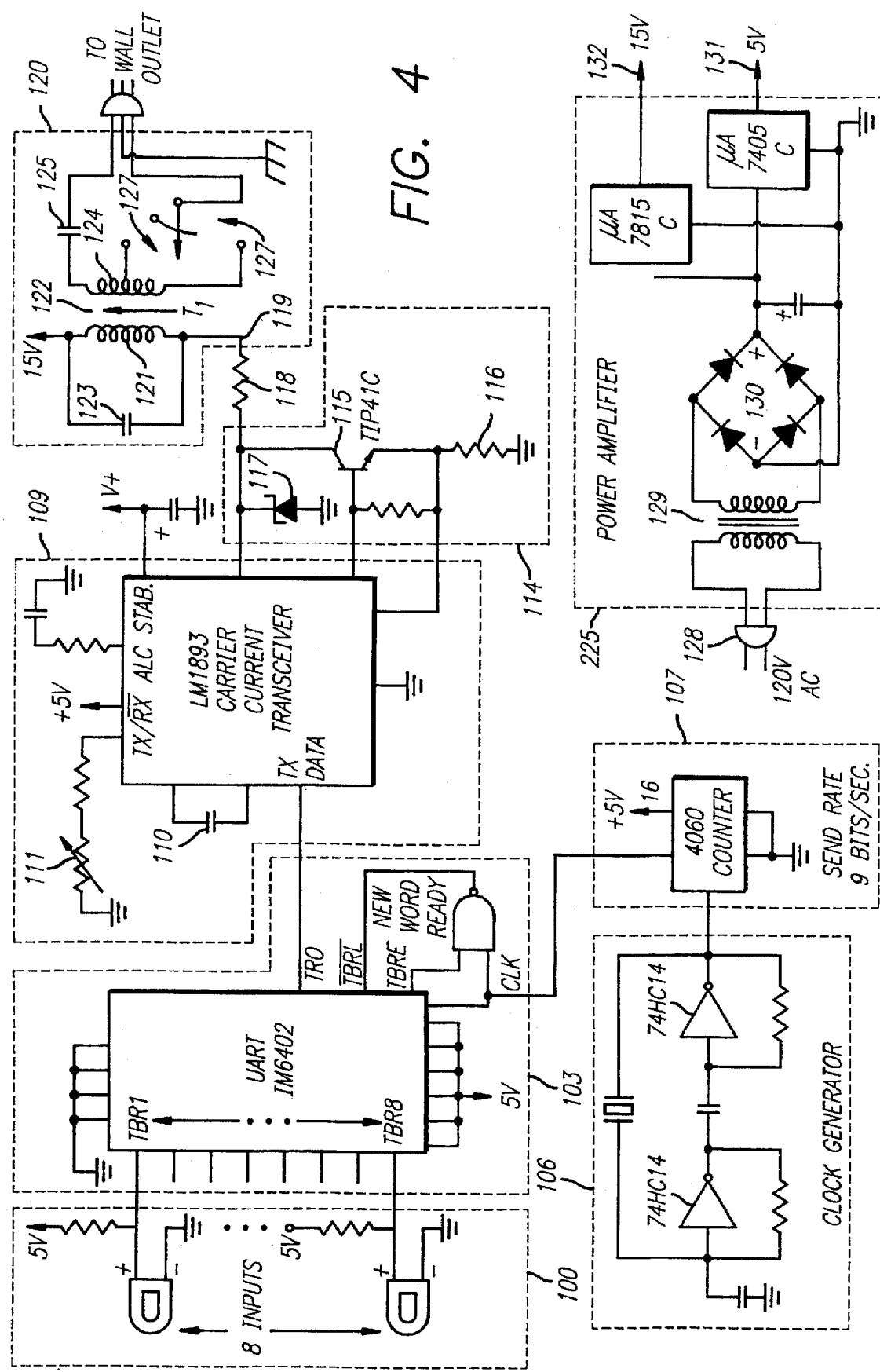
FIG. 4 is a more detailed circuit schematic illustrating the implementation circuitry for the block diagram of FIG. 2.
Figure 5:
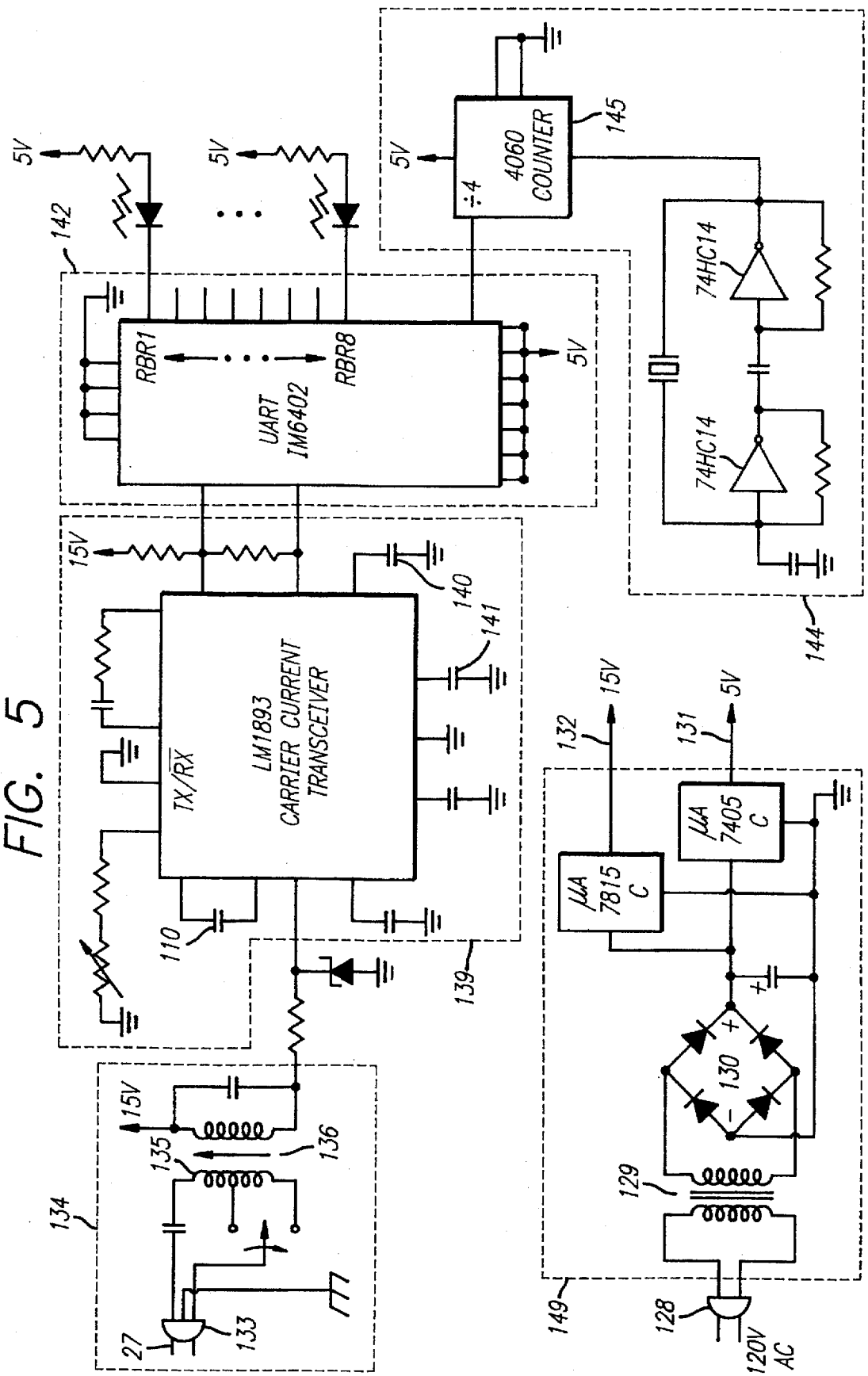
FIG. 5 is a more detailed circuit schematic illustrating the implementation circuitry for the block diagram of FIG. 3.

The details of the circuitry as illustrated in FIGS. 2 through 5 are now described. An FSK communication system includes a set of devices that communicate over the residential power line 27. There is illustrated in FIGS. 2 and 4 a transmitter operating in a broadcast mode sending digital data over a power line 27 to a plurality of receivers, as illustrated in FIGS. 3 and 5, coupled to the same power line 27. The range of operation is localized to all outlets 19 within the same power transformer circuit. With additional circuitry, such as carrier detect or microprocessor based arbitration circuitry, multiple transmitters on the same power line circuit can be supported.

A description of the system block diagrams of the transmitter and the receiver and detailed circuit schematics is further provided. Shown respectively in FIG. 2 and FIG. 4 are block diagrams of the transmitter and its circuit implementation. Current sensors 100 monitor the on/off state of respective appliances 12 to 17. Each appliance is respectively connected through cable system 18 to a respective current sensor 100. The power for each sensor 100 is obtained through extension cords 101 provided in a power box 202 which is adapted to contain current sensors 100. The extension cords are connected with wall outlet 20 through 25, respectively, to which associated appliances 12 through 17 are connected.

The current sensors 100 sense the presence of a current in a washing machine or dryer 12 to 17 and convert the sensed current into a digital signal which is transmitted along lines 102. The threshold swing level is adjustable. Other types of sensors 100 can output a voltage signal proportional to the actual current. Alternatively, audio or vibrational sensors may be employed which sense the operational status of an appliance. With analog to digital converters, this signal can be used to determine the specific state of the appliance in a detailed manner if a data base of information relating the machine cycle with current consumed is available. The detailed information may include the particular cycle of the appliance.

In one embodiment, the sensor outputs are scanned periodically, and a data base is established containing information relating to the operation status characteristics of each particular appliance being monitored. A particular sensor output signal may then be compared to relevant data base entries to determine the specific state of an appliance. The data base may be updated and/or modified with the addition of a new appliance or modification of existing appliances. Moreover, software is preferably executable by the controller 205 or other known means which is preferably contained within the programmable outgoing signal box 26. Such software may operate independent of, or together with the data base, as well as executing various control and user interactive functions. Further, configuration dip switches 259, discussed later in greater detail, are provided which are set to an appropriate configuration setting for each particular appliance. These dip switch 259 settings are periodically read by the controller 205, and this information may also be incorporated into the data base. This data preferably indicates the functional type of machine or appliance being monitored by each of the sensors 100. Additionally, the controller 205 can detect the loss of proper program operation and cause the system to automatically reset.

The digital signals are directed to a parallel-to-serial multiplexer 103 where the parallel digital data from each appliance 12 to 17 in a packet of 7 or 8 bits (set by the UART) is multiplexed into a serial form. Other options provided by the UART include setting the number of stop bits and enabling parity checking. Enabling parity checking and setting the number of stop bits to 2 (the maximum) will reduce the bit error rate but will lower the effective transmission bit rate as well. The output of the UART consists of a serial stream of digital data 104 along line 105.

A transmit data rate is determined by an integral division of a clock generator 106 which is crystal controlled to run at 2.4576 Mhz. A division factor of $2^{14}$ is chosen to give a bit rate of 9.37 bits/sec, and this is effected by counter 107. After each packet is sent, a Transmit-Buffer-Register-Empty (TBRE) signal is generated by the UART which is combined with a 16× transmit clock though an AND gate. This generates a Transmit-Buffer-Register-Load (TBRL) signal to begin transmission of the next packet. The signal from the counter 107 is directed to the multiplexer 103 through a sampling clock 108.

The serial stream of digital data 104 from the UART along line 105 modulates the frequency of the output of a voltage controlled oscillator 109 which is chosen to be 125 Khz with a frequency deviation typically of 3.7%. This is set by capacitor 110 and resistor 111. The center frequency is selected such that it is low enough to avoid excessive transmission attenuation through the power lines 27 and high enough to make rejection of the 60 Hz signal with simple filters feasible. The FSK output square wave signal 112 is directed along line 113 to a power boost amplifier 114.

The amplifier 114 shown in FIG. 4 consists of a power NPN transistor 115 biased to operate linearly as opposed to switching which would cause additional harmonic distortion. A current limit is determined by the emitter to ground resistor 116. A 47V Zener diode 117 in series with a 5Ω resister 118 are used to suppress and absorb voltage spikes and transients coupled from the power line 27.

. The output current of the NPN transistor 115 is directed along line 119 to a bandpass filter 120. The filter 120 has a high Q tuned tank circuit, and the inductor 121 of transformer 122 and capacitor 123 are selected to produce an output current with low harmonic distortion. The output current through inductor 121 is coupled to inductor 124 to provide impedance matching with the power line 27. The combination of inductor 124 and capacitor 125 forms a high-pass filter which rejects 60 Hz AC power signals. Depending on the local impedance of the power line 27, either 7Ω or 14Ω output impedance 127 from the transformer 122 can be selected to provide the best match. The output from filter 120 is directed to the wall outlet or power line 27.

In FIG. 4, there is illustrated as a power amplifier or supply system 225 for the transmitter. A 120v input 128 is fed through a transformer 129 and bridge 130 to provide a 5v output 131 and 15v output 132 which supplies power to the transmitter system.

In FIG. 3 and FIG. 5, there are respectively the block diagrams for the receiver and its circuit implementation. The receiver is connected to a wall plug outlet 133 which in turn is connected with power lines 27. The receiver front end input consists of similar high pass and bandpass filters 134 as the transmitter. This maximizes the energy of the received signal while minimizing the effects of out-of-band noise. Selecting the best impedance match, namely 7 or 14 Ohm, and inductance 135 of transformer 136 depends on the local impedance of the power line 27 which can be affected by the state and type of nearby appliances.

The signal from the filters 134 is preferably an FSK signal 137 fed along line 138 to a phase-locked-loop FSK demodulator 139 contained in the LM1893 carrier current integrated circuit. This circuit 139 demodulates the Frequency Shifted Keyed signal into serial digital data 140. The phase-locked-loop components are determined by the expected bit rate of arrival. For a bit rate of 9 bits/sec., the impulse filter capacitor 140 is chosen to be 0.47 µF., while the value of 10 µF. is chosen for the frequency offset storage capacitor 141. These components are expected to scale inversely with the designed transmission bit rate.

The serial data 140 is demultiplexed back into parallel data using a Universal Asynchronous Receiver Transmitter Circuit (UART) 142. The same parameters for parity, stop bits, and packet length, etc. as the transmitter are chosen for the receiver UART. Using the same clock rate as the transmitter, the serial data is demultiplexed into parallel form by the UART and transmitted along parallel lines 143.

A receiver clock generator circuit 144 is of a substantially similar design as the transmit clock circuit 106 and counter 107 which preferably operate at 9.4576 MHz. A divider circuit 145 is used to reduce the clock rate by $2^{14}$ to 150 Hz. To extract the bit timing information, the UART demultiplexer 142 employs a digital phase-locked-loop 146 which utilizes an over-sampling clock 144. The oversampling rate is chosen to be 16×to match the transmitter clock which implies a receive bit rate of 9.375 bits/sec.

The parallel outputs 143 of the UART demultiplexer 142 employs active low logic to control diode drivers 147. Light emitting diodes 148 serve as status indicators of the state of the washers or dryers being monitored. In a more sophisticated implementation, this data from the UART demultiplexer 142 can be clocked in to a microprocessor memory for further processing after which a liquid crystal display can be used to convey more detailed information about the state of a washer/dryer units 12 to 17.

The power supply 149 used for the receiver is preferably similar to that used for the transmitter. As such, the same circuit elements and reference numerals apply to both circuits.

An alternate form of modulation, other than FSK, which may be employed is Spread Spectrum Pseudo-noise Modulation. A suitable alternate FSK transmitter and receiver is the Signetics NE5080, 5081. Suitable alternate power line transceivers include the Signetics NE5050.

Figure 6:
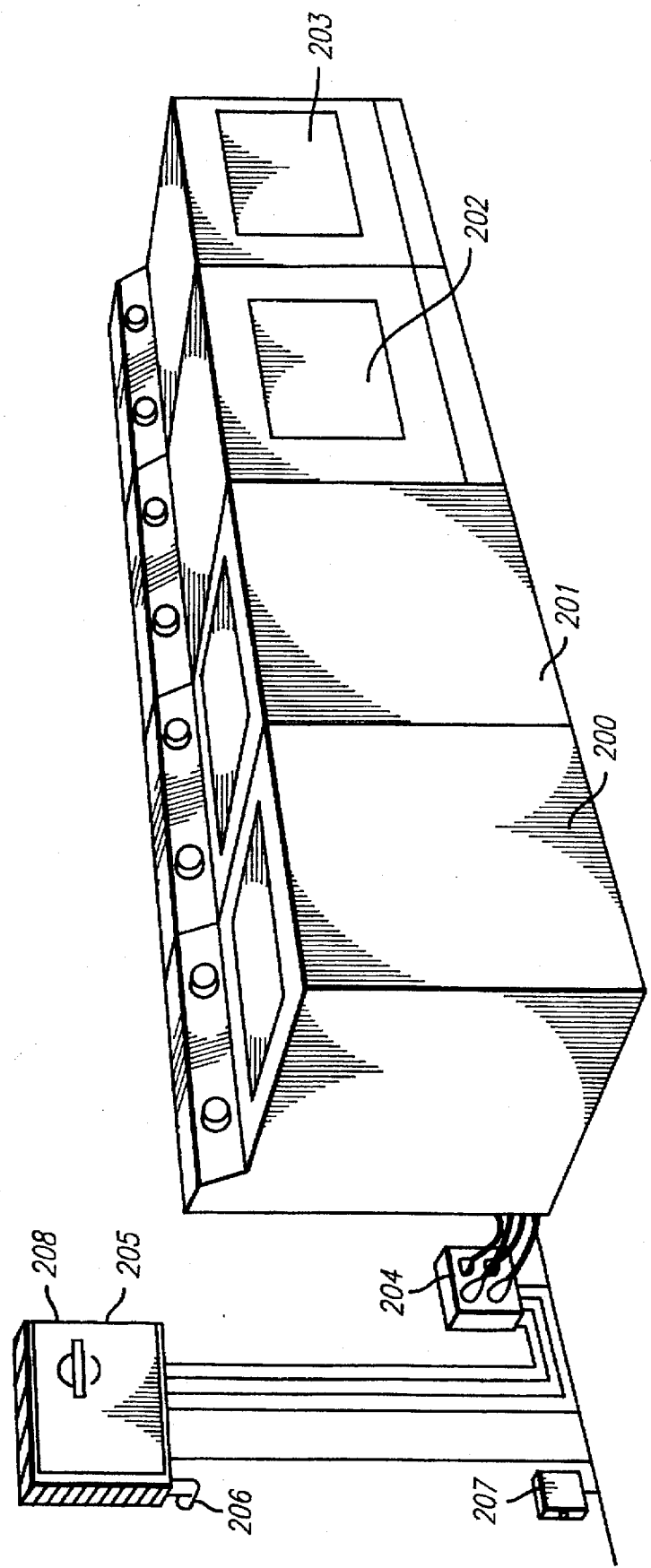
FIG. 6 is a perspective view illustrating four appliances connected to a power outlet, and in turn to a controller connected to a power source and a telephone jack.

A different embodiment of the invention is now described which is illustrated in FIGS. 6 through 18. In this embodiment, power consuming devices, being two washer units, are illustrated in FIG. 6 as units 200 and 201. Two dryer units are illustrated in FIG. 6 as units 202 and 203. The units are connected through an AC power outlet 204 for consuming variable power dependent on the loading of each of the units 200 to 203. Within the power outlet 204, there are four sensors provided for sensing the condition of each one of the devices 200 to 203 by measuring the operational signal parameter applicable to each of the devices 200 to 203. The signal parameter may be the time elapsed, time remaining, power consuming status or power non-consuming status of each one of the multiple appliances 200 to 203, for example.

The power from the sensor in the sensor outlet box 204 is communicated to a controller 205 within which there is provided a master unit 211 and a slave unit 210. The controller 205 receives AC power from outlet 206, and the master 211 is connected through a telephone outlet interface 207 to a dedicated telephone line. The outer face of box 208 of the controller 205 includes a keypad and an LCD display. The keypad permits a user to interface instructions and information between each one of the units 200, 201, 202 and 203 as selected and a remote transceiver means which could be a telephone, a personal computer or other type of computer and computer interface, or a household control and monitoring system, for example, located in an apartment, condominium or townhouse. In this manner, the user can interactively select an appliance using a selected telephone number. The LCD display indicates information about the remote unit and appliance and permits the user to instruct and preset the communication as required.

In another embodiment of the present invention, the predetermined time remaining on a power consuming cycle of units 200 to 203 may be communicated to a remote telephone or computer system. In this manner, the imminent completion of the cycle of a unit can be transmitted to a remote user so that the user can then come to a location where the units are located and remove washing from the washers or dryers. In other situations, the remote unit can access the appliances as necessary and reserve an appliance for a short time period prior to commencement of use. In this fashion, a user then has time to come from a remote location to the laundry room and use the appliance. Also built into the system is the facility to ensure that a person communicating to a remote location, by connecting a remote telephone link to the unit, cannot connect that link unless an appropriate password is entered. This capability prevents mischievous use of the system.

The controller 205 includes means for storing information about the status of the appliance 200 to 203, this information being regularly updated. As discussed previously, the status information may be stored in a data base being operated upon by the controller 205. The controller 205 effectively includes a master unit 211 and several slave unit means 210. The master 211 can operate a plurality of slave units 210, preferably six such units, each of which in turn can operate a plurality of devices such as 200 to 203, preferably a total of twenty-four such devices. The communication is generated by the controller 205 to a remote transceiver, being a telephone or computer system, and is preferably effected through voice synthesis, while the communication from the transceiver to the controller is preferably effected through a touch tone telephone or computer system, wherein a remote user can instruct and set up the controller 205 according to signals transmitted to the controller 205 by the key pad of the telephone or computer system.

Through the telephone interconnect jack 207, a remote centralized diagnostic facility can be connected with the controller 205. In this manner, the controller 205 can be accessed so that operational difficulties with the controller 205 can be remotely rectified. Thus, if a sensor for any one of the units 200 to 203 is nonoperational, a telephone instruction may be transmitted to either reset the controller 205 or indicate to a user that a sensor is not operational, or that the appliance should be disabled from the system or otherwise connected into the system.

The controller 205 is preferably configured such that communications to remote stations can only be effected to a first range of stations, namely, stations in an apartment building as opposed to long distance remote locations. However, the controller 205 can receive telephone communications from a broader second range. The two ranges may overlap.

The sensors in outlet box 204 are preferably configured to sense current consumed by a timer, the current being less than about 1 Amperes at a frequency of about 50 Hz to about 60 Hz. The appliances 200 to 203, in contrast, typically operate in a normal mode by drawing a current in excess of about 10 Amperes.

Figure 7:
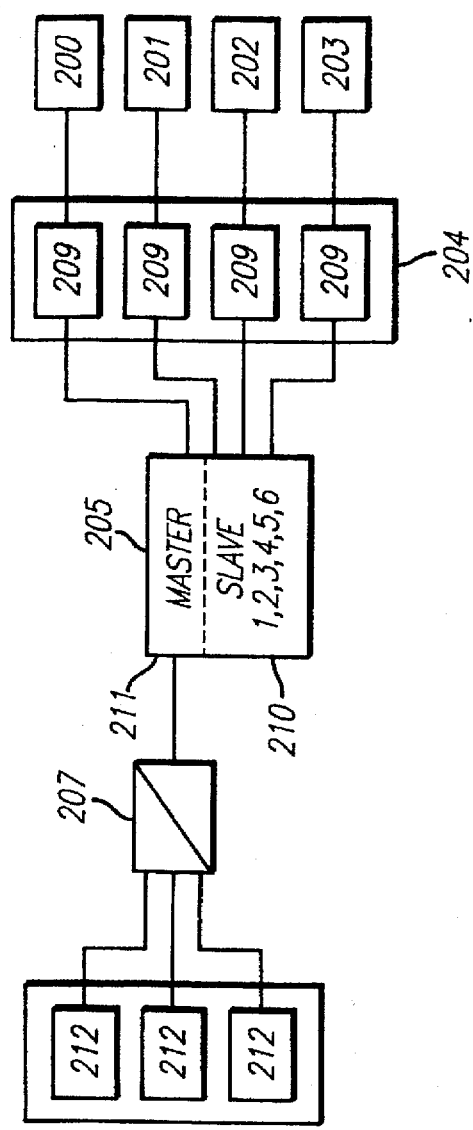
FIG. 7 is a simplified diagrammatic illustration of the relationship of the controller with appliances, sensors, and transceivers.
Figure 10:
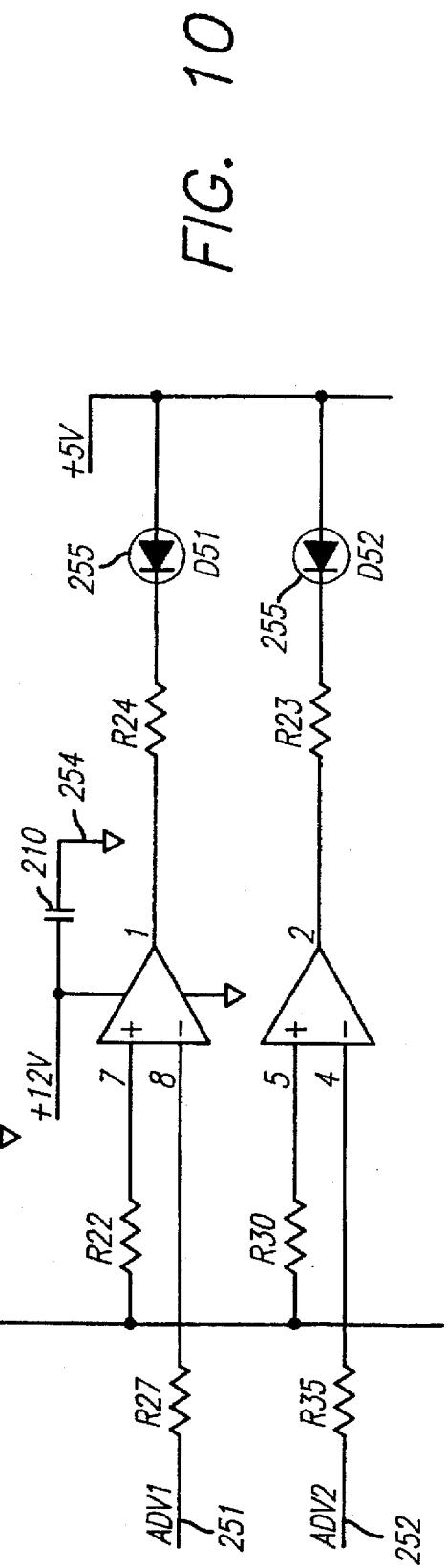
FIG. 10 is a schematic of a comparator circuit operable in response to the output from the sensor circuit. Preferably, there are 24 such comparators, each responsive to a different sensed appliance.

In FIG. 7, the four units or appliances 200 to 203 are illustrated connected with specific sensor elements 209 which will be contained in the outlet sensor box 204. The sensors 209 are directed to the slave 210 which is controlled by the master 211 of the controller 205. The output from the master 211 is directed to the telephone jack 207 which in turn is connected to the telephone transceivers 212 at the remote locations.

Figure 8:
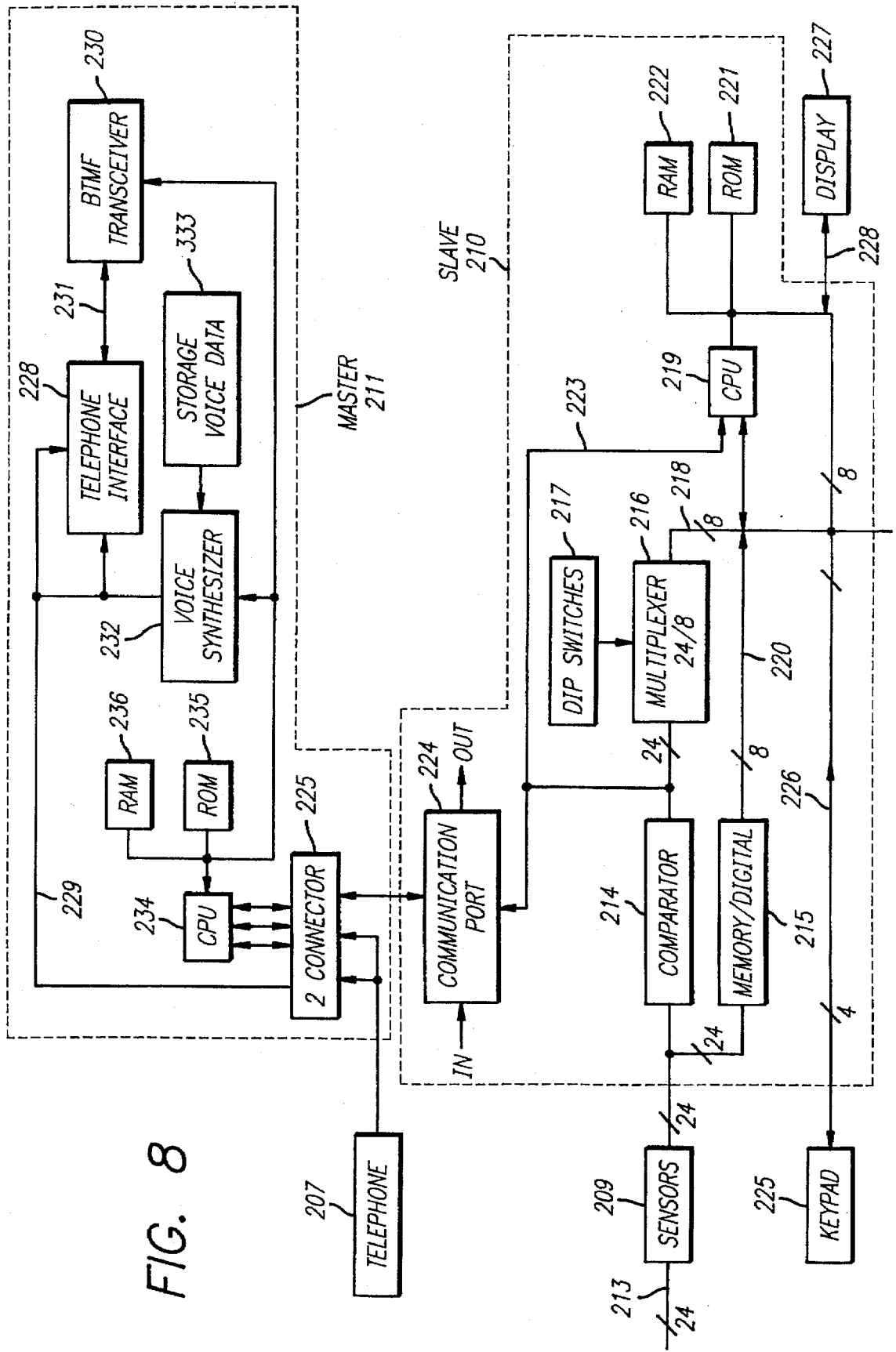
FIG. 8 is a schematic illustrating the main components of the controller with a single slave operational with the master, the slave being connected preferably with 24 sensors and being operational through a keypad and having an interactive display.

In FIG. 8, a detailed schematic is provided. Sensors 209 can preferably receive inputs from 24 appliances of the type described as 200 to 203, and are coupled to line 213. The outputs from the 24 appliances are directed to a comparator 214 and to an analog-to-digital circuit 215. The 24 outputs from the comparator 214 are directed to a multiplexer circuit 216 which is connected with dip switches 217. The multiplexer 216 output is an 8 line signal (designated as 218) which is coupled to the central processing unit 219. The analog-to-digital 215 output is also an 8 line signal transmitted along the CPU bus lines 220. The CPU 219 is connected to a read only memory (ROM) 221 which stores the main operating program of the system. Read only memory, or other additional non-volatile memory, may be employed to provide data base capabilities to store and manipulate sensor and/or dip switch configuration information. A random access memory (RAM) 222 is also connected to the CPU 219 such that different functions of the system can be performed. Random access memory may similarly be employed to interact with a data base. The CPU 219 of slave system 210 is also interconnected by line 223 using a communication port 224. The slave 210 is also interactive with a keyboard 225 which is connected through line 226 with the CPU 219. An LCD display 227 is interconnected through line 228 with the slave 210.

The communication port 224 is connected with the connector 225 of the master 211. The connector 225 is connected with the telephone jack 207. Through the connector 225, the telephone 207 is connected with the telephone interface 228 through line 229. The interface is connected with the DTMF transceiver 230 through line 231. A voice synthesizer 232 is connected with the telephone interface 228, and the storage for the voice data 233 is connected with the voice synthesizer circuit 232. The connector 225 for the master is also connected with the CPU 234 for the master unit which has a ROM 235 and a RAM 236 through which the master 211 is operated.

Figure 9A:
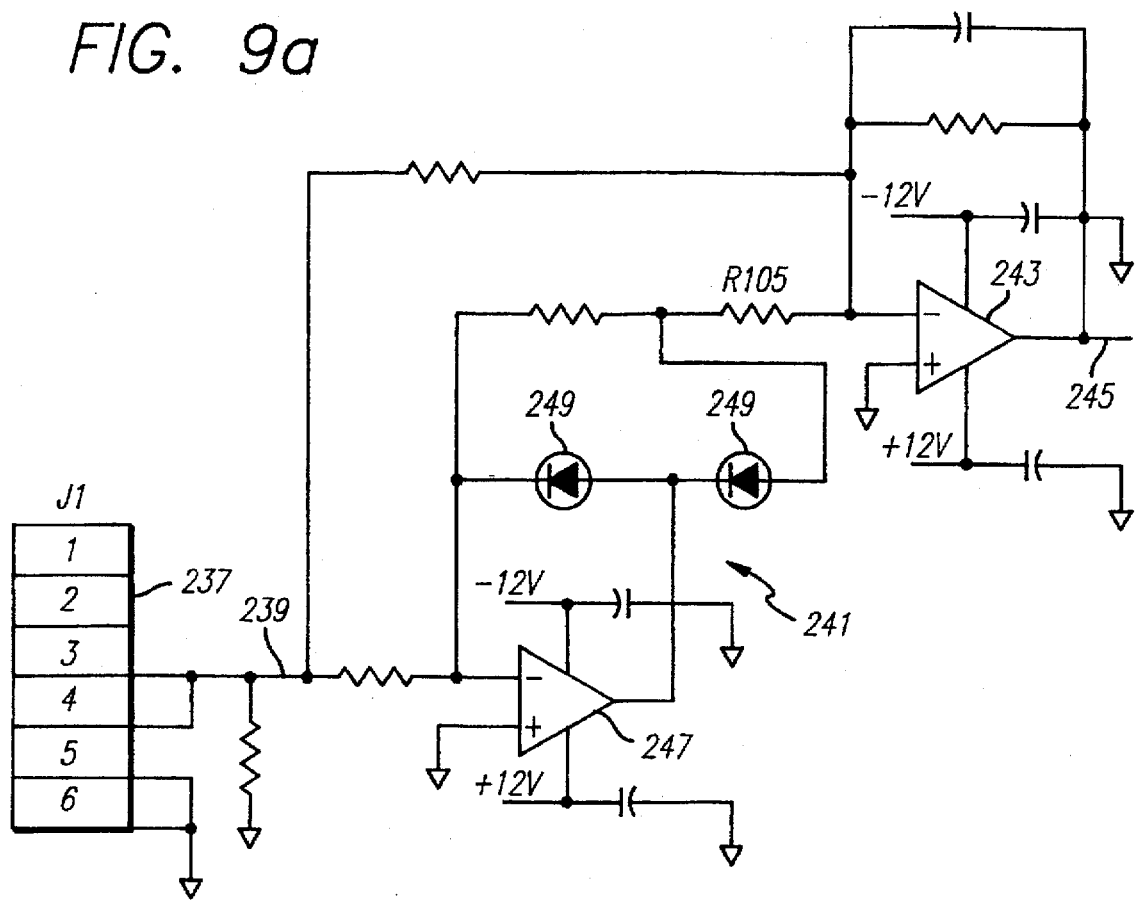
FIGS. 9a and 9b are electrical schematics of two sensor circuits connected respectively with a laundry appliance outlet on the left hand side and providing an output signal respectively on the right hand side.
Figure 9B:
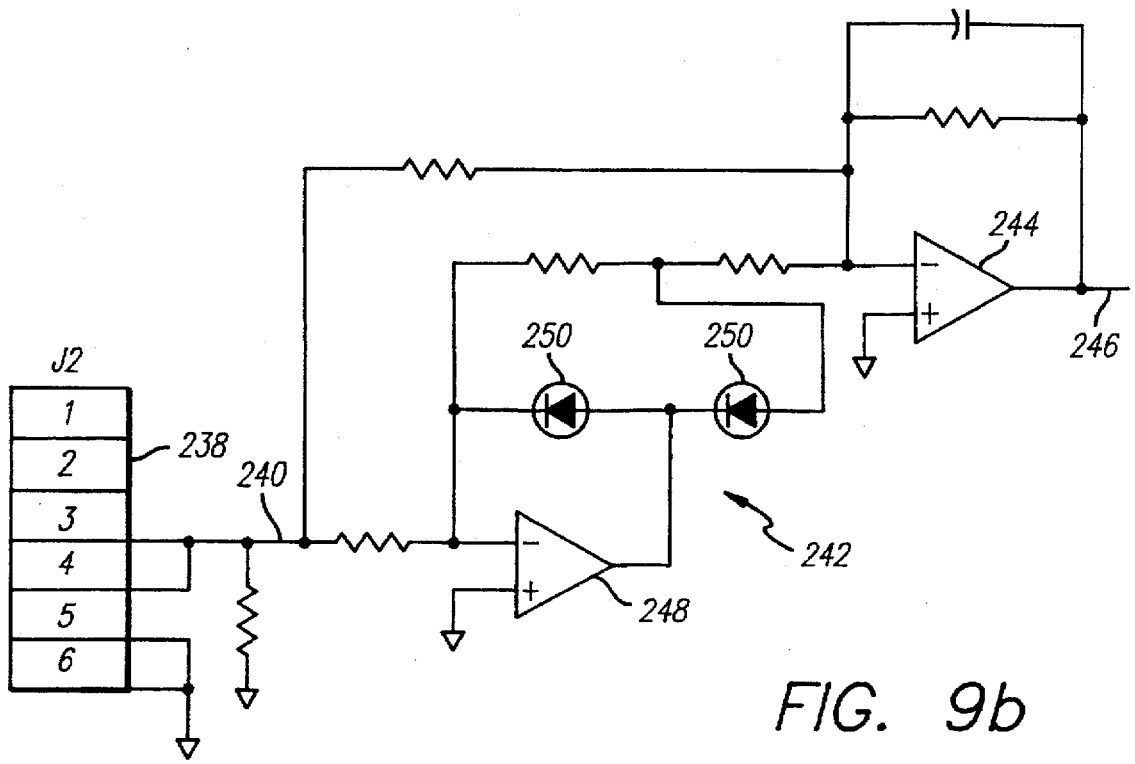

In FIGS. 9a and 9b, the sensors 209 are illustrated. The input to the sensor 209 is through a transformer with conventional primary and secondary windings. The respective inputs 237 and 238 are directed along lines 239 and 240, respectively, to rectify as circuit 241 and 242. Further rectifiers 243 and 244 are in line such that the output is an RMS average DC level signal transmitted along output lines 245 and 246. The output range is preferably between 0.5 volts and 10 volts. The amplifiers 247 and 248 operate with the diode-banks 249 and 250 to provide the effect of rectification in the comparator system.

Effectively, there can be 24 outputs, 245 and 246 respectively, from the sensor illustrated in FIGS. 9a and 9b which are equivalent elements 209 in FIG. 8. The outputs 245 and 246 are directed to lines 251 and 252 respectively, of the comparator 214 illustrated in FIG. 10. The comparator 214 receives the analog voltage along lines 251 and 252 and there is a fixed reference voltage along line 253. The output of the comparator 254 is directed toward the multiplexer 216. An LED 255 located in each input line from the sensor provides for a visual review of whether or not the relevant sensor is sensing current. The LEDs can be located in the outside panel 208 of the controller 205. Thus, an operator can also visually see whether an appliance 200-203 is operational. The signal 205 which is outputted from each sensor is in an analog form and is directed to the multiplexer 216.

Figure 11:
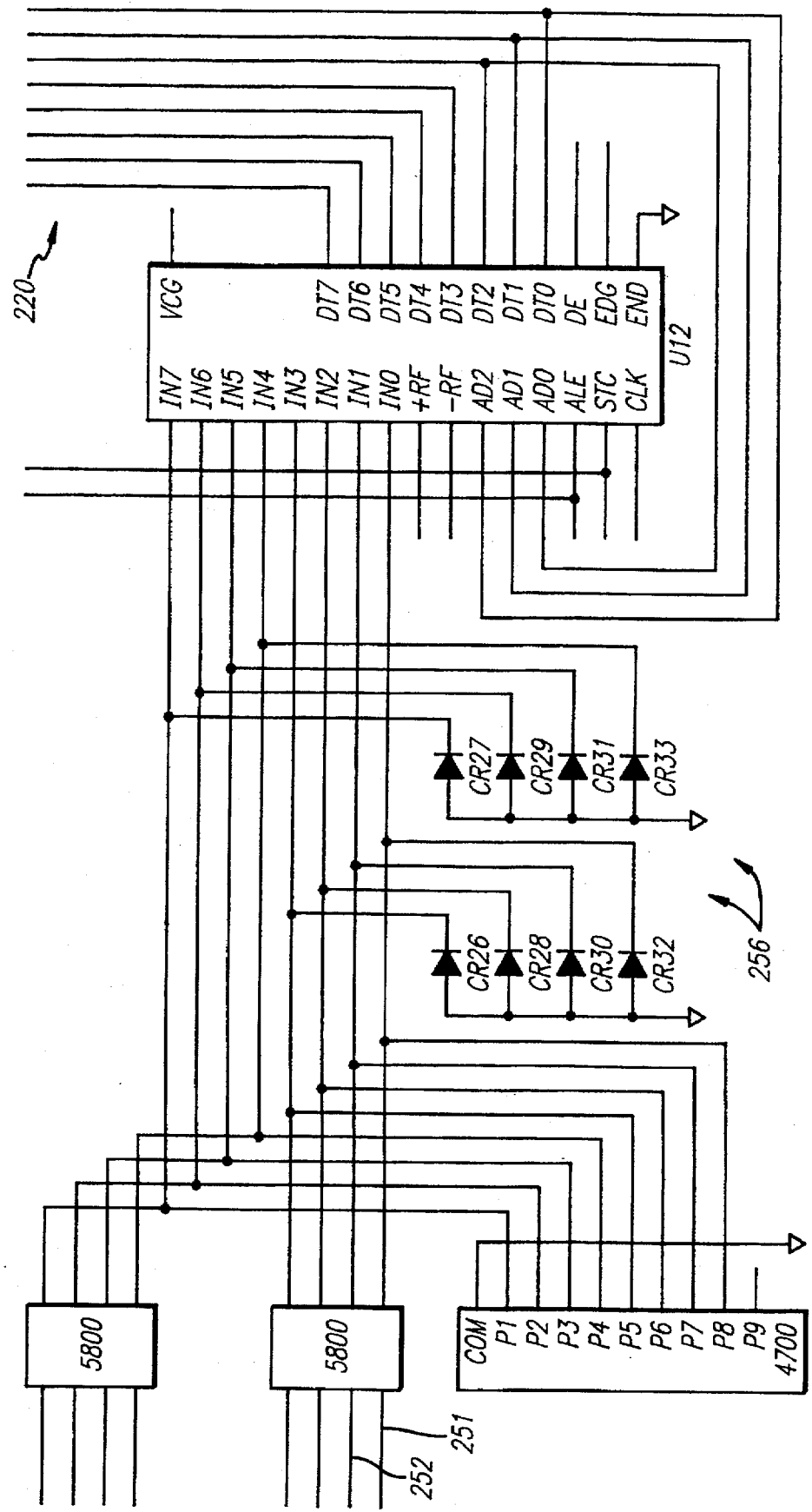
FIG. 11 is a schematic of an analog-to-digital converter representing input for eight analog signals. Preferably, three such converters are applicable to receive 24 analog signals which are then outputted along a common bus to the central processing unit.

In FIG. 11, the same analog information is shown being directed to an analog-to-digital converter along lines 251 and 252. The converter, as shown in FIG. 11, is one of three components. There are 8 input lines shown representing one-third of the input lines from different appliances. The signal is passed through different processing chips as shown, and is outputted along eight lines 220 which is the CPU bus directed to the CPU 219. The three banks of analog-to-digital converters are connected in parallel so that the outputs from all eight lines are digitally fed to the CPU 219 along the output line 220. The rectifier bank 256 provides protection against transients entering the system.

Figure 12A:
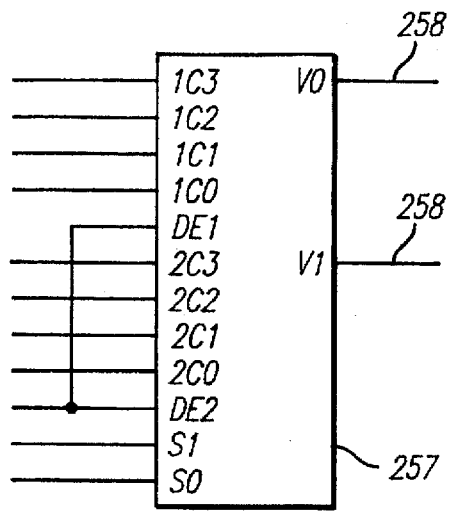
FIG. 12a is a chip to effect a multiplexing function. Preferably, twelve of such units effect a multiplexing function.

As shown in FIG. 12(a), the signal from the comparator 214 is inputted to a multiplexer chip 257 which forms one of twelve such chips to effect appropriate multiplexing of the system. The output 258 from the representative multiplexer chip 257 is directed to the CPU 219.

Figure 12B:
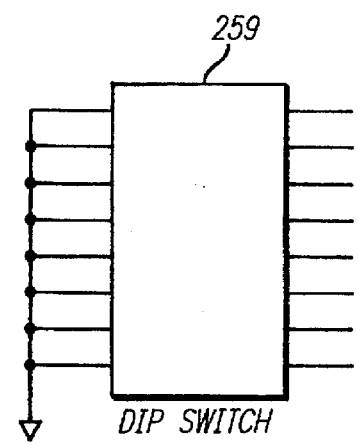
FIGS. 12b and 12c are part of the dip switch configuration, FIG. 12b being the dip switch and FIG. 12c being a chip operational in conjunction with the dip switch and the multiplexer units, the switch and multiplexer acting to transmit information to the central processing unit to configure itself.
Figure 12C:
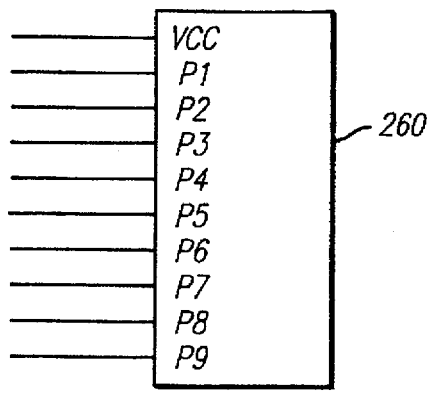

As shown in FIGS. 12(b) and 12(c), the multiplexer 257 is also connected with dip switch elements 259, which are operational with chips 260. An appropriate dip switch 259 is provided for each one of the appliances such that a sensor is set up to permit the CPU 219 to configure itself appropriately for appliances which can be washers or dryers as indicated. There are twenty four dip switches 259 multiplexed into three groups of eight.

Figure 13A:
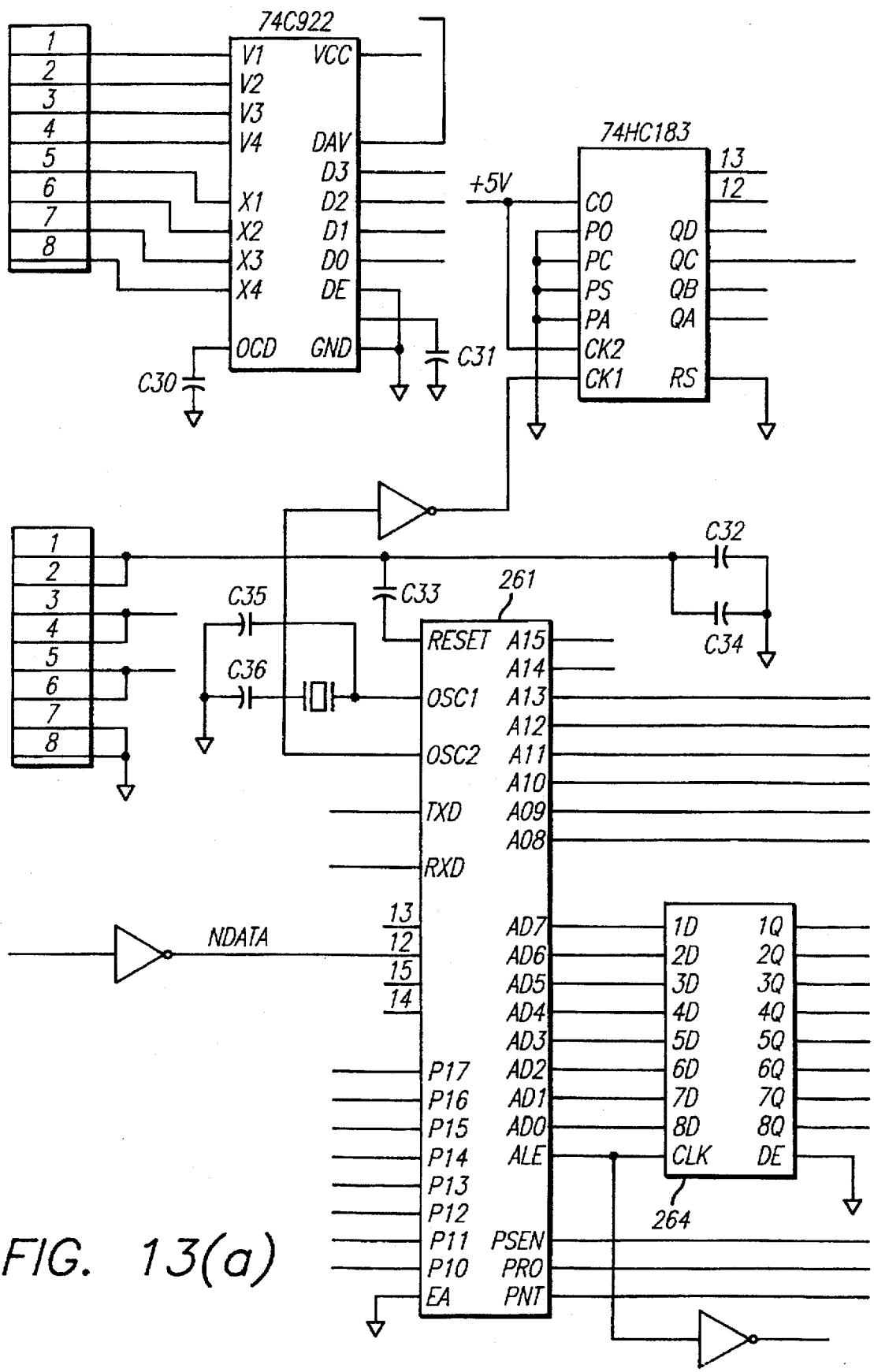
FIG. 13 is a schematic illustrating the central processing unit in cooperation with the memory and display interface.
Figure 13B:
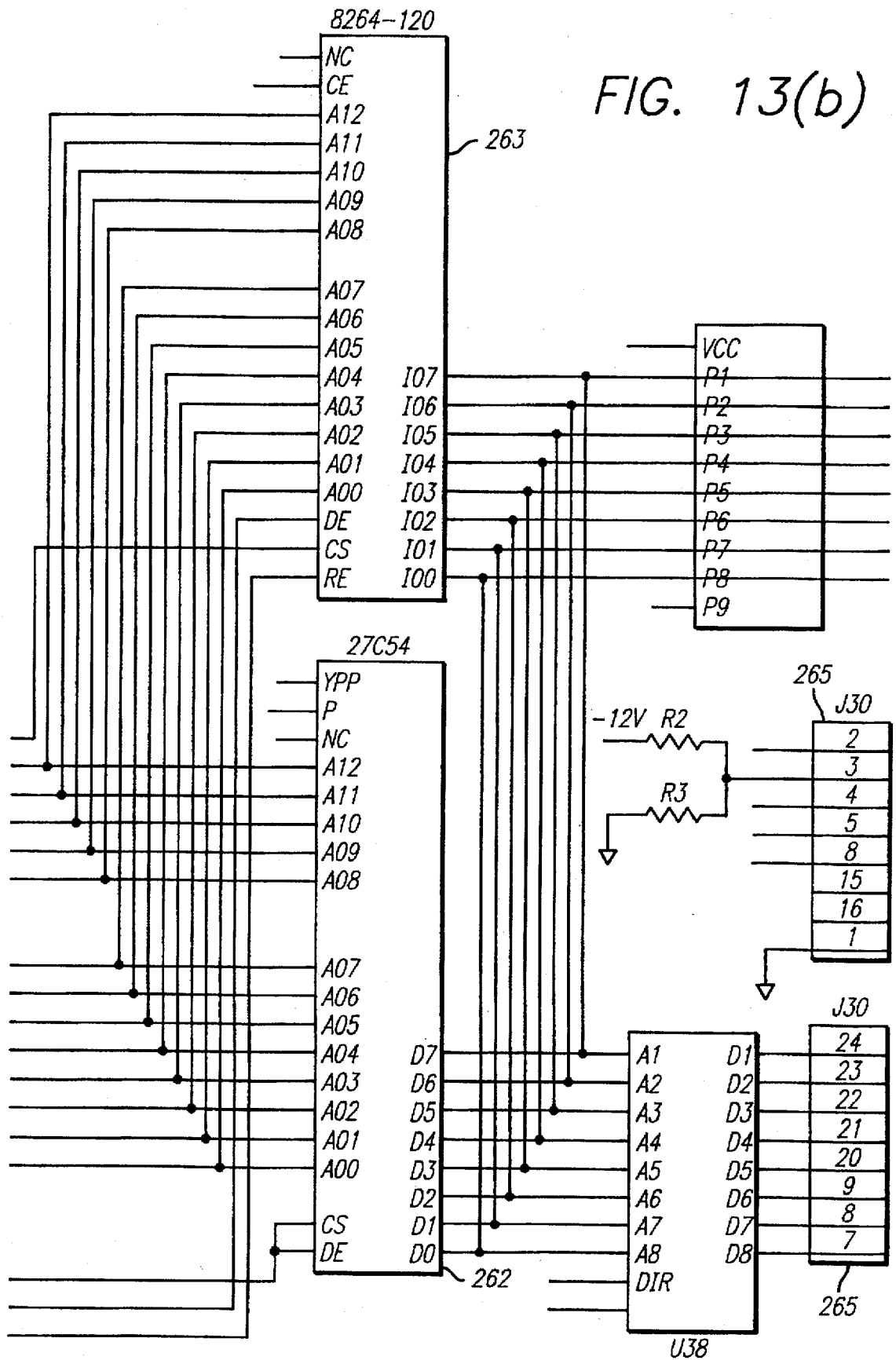

In FIG. 13, as illustrated, the CPU chip 261 is operable with a ROM 262 and a RAM 263. There is also a buffer 264 between the CPU 261 and the memory chips 262 and 263. The display interface on the front panel 208 is indicated as 265 and is appropriately connected to ROM 262 and RAM 263. The display interface includes two lines 265.

Figure 14A:
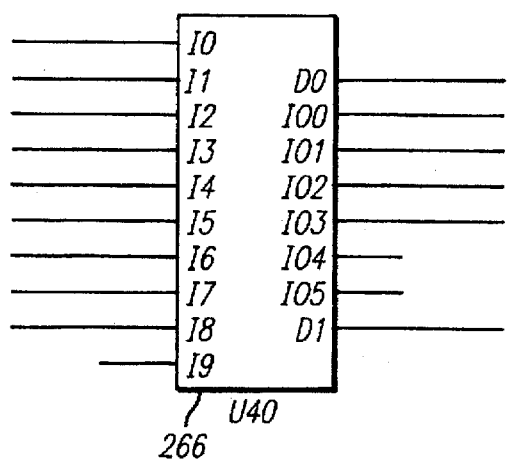
FIG. 14 is a schematic illustrating two chips for controlling the central processing unit.
Figure 14B:
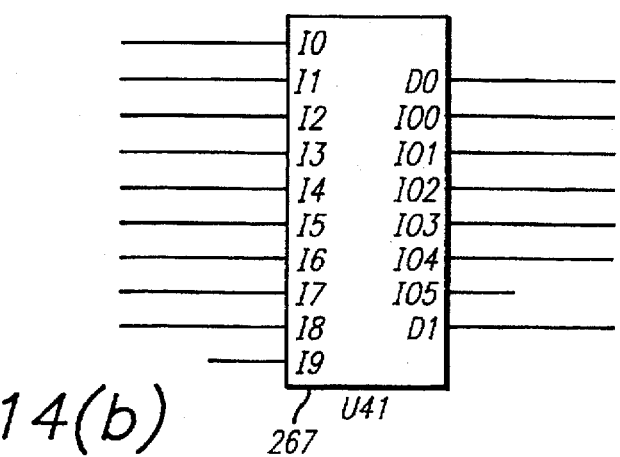

The chips 261, 262 and 263 are all set up on a programmable logic which is controlled by the chips 266 and 267 in FIG. 14. These chips control the input/output management of the memory devices 262 and 263, and provide the actual map determinants for the devices 262 and 263. These devices insure that appropriate signals are communicated between the requisite appliances 200 to 203 and the remote transceivers.

Figure 15:
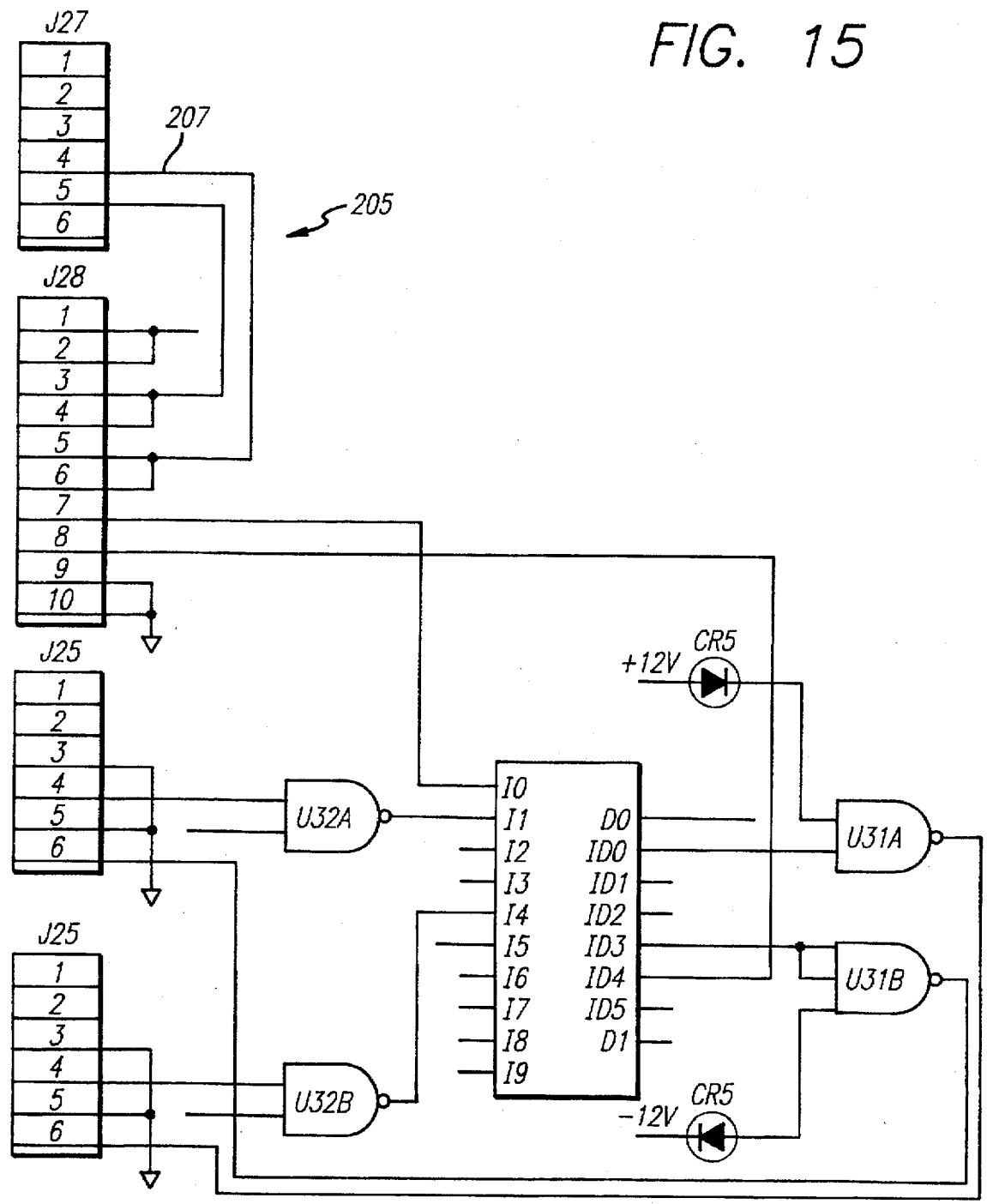
FIG. 15 is a schematic illustrating the communication port and telephone connector.

In FIG. 15, the connection with the master 211 of the controller 205 is illustrated. The telephone interface 228 is connected as part of the master 211 to which the telephone jack 207 is connected. The telephone interface 228 is connected in telephone jack 207 and power is received from the CPU 234 in the master 211.

Figure 16:
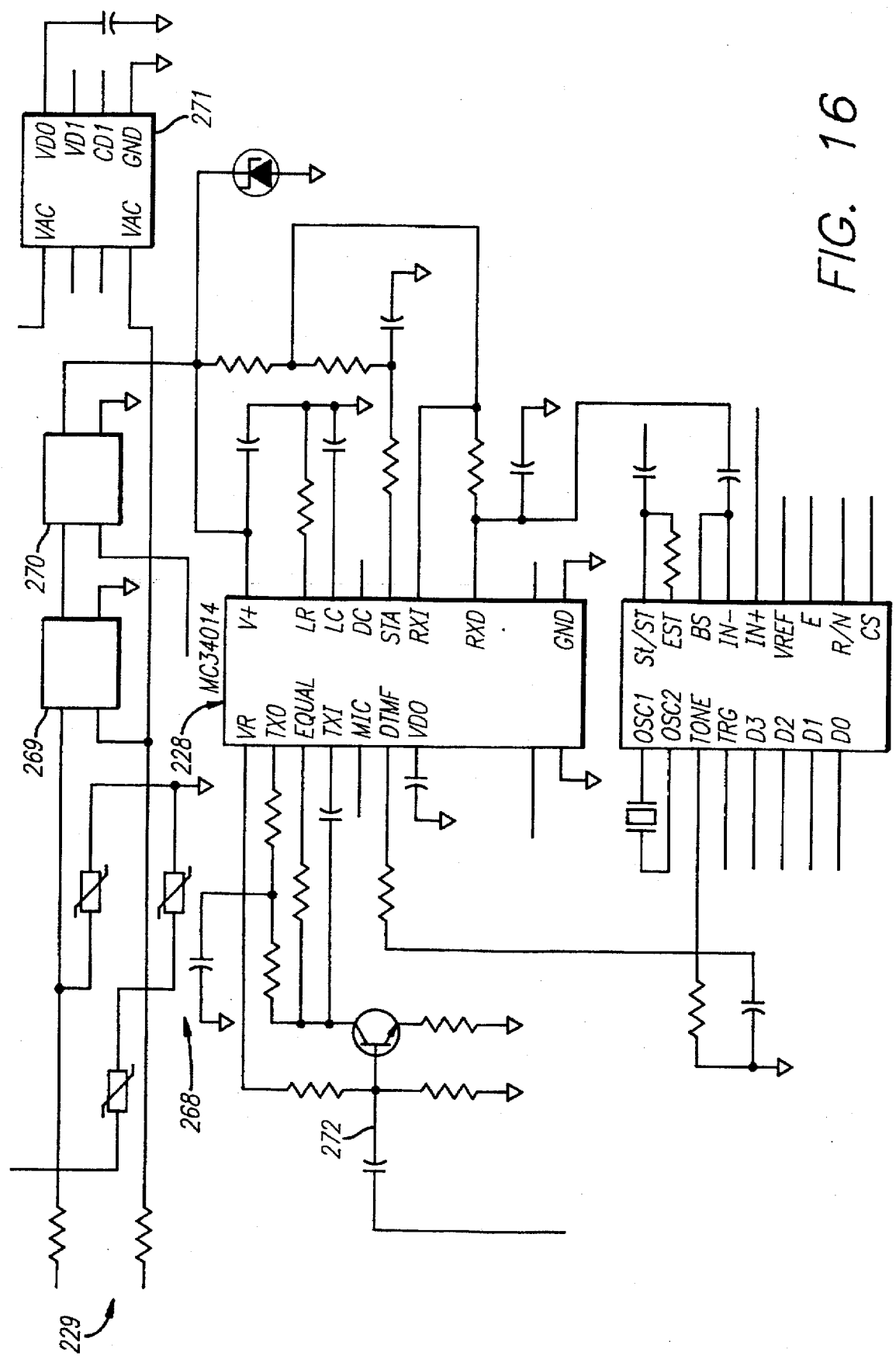
FIG. 16 is a schematic illustrating the telephone interface and the DTMF transceiver.

In FIG. 16, the telephone input lines 229 are directed to the telephone interface 228 which includes a protection circuit 268, a polarizing bridge 269 and a solid stage switch 270 which is A-C-coupled to the telephone interface processor 271. A telephone interface chip 228 receives a signal from the telephone line and also synthesizes a voice signal along line 272.

Figure 17A:
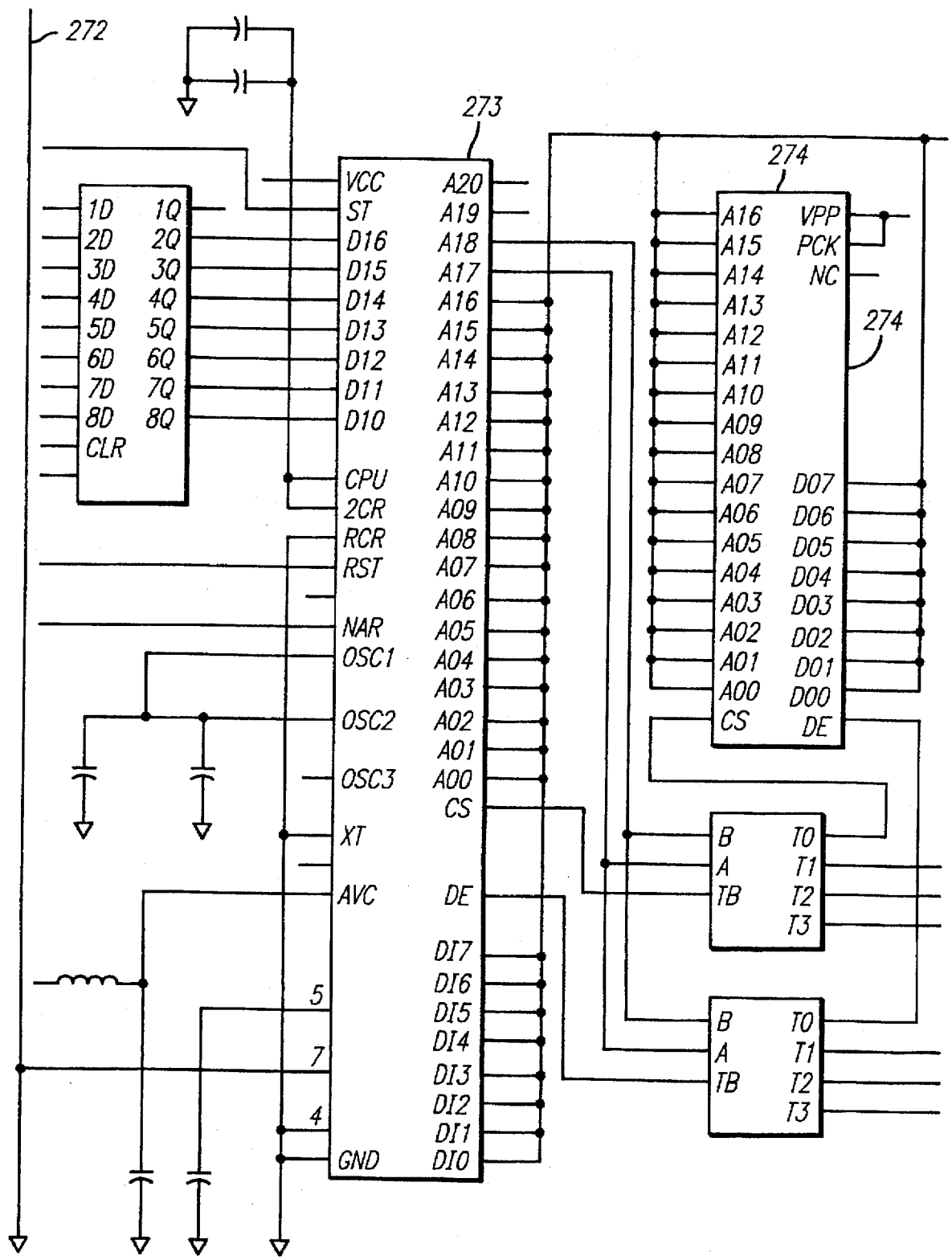
FIG. 17 is a schematic illustrating the voice synthesizer for inputting voice to the telephone interface.
Figure 17B:
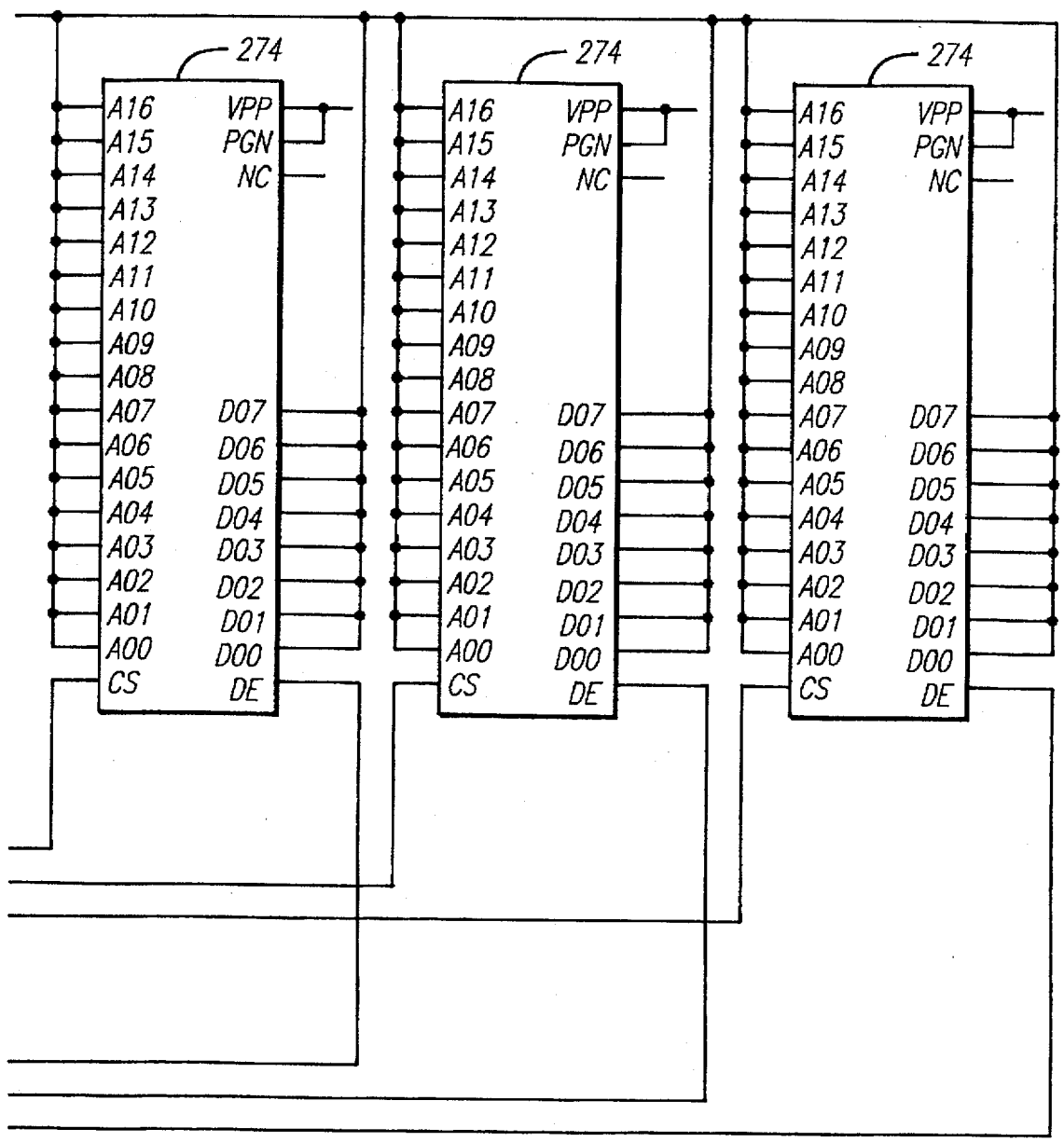

In FIG. 17, the voice synthesizer includes a control chip 273 and four chips 274 for generating the synthesized voice to feed along line 272 to the telephone interface 228.

Figure 18:
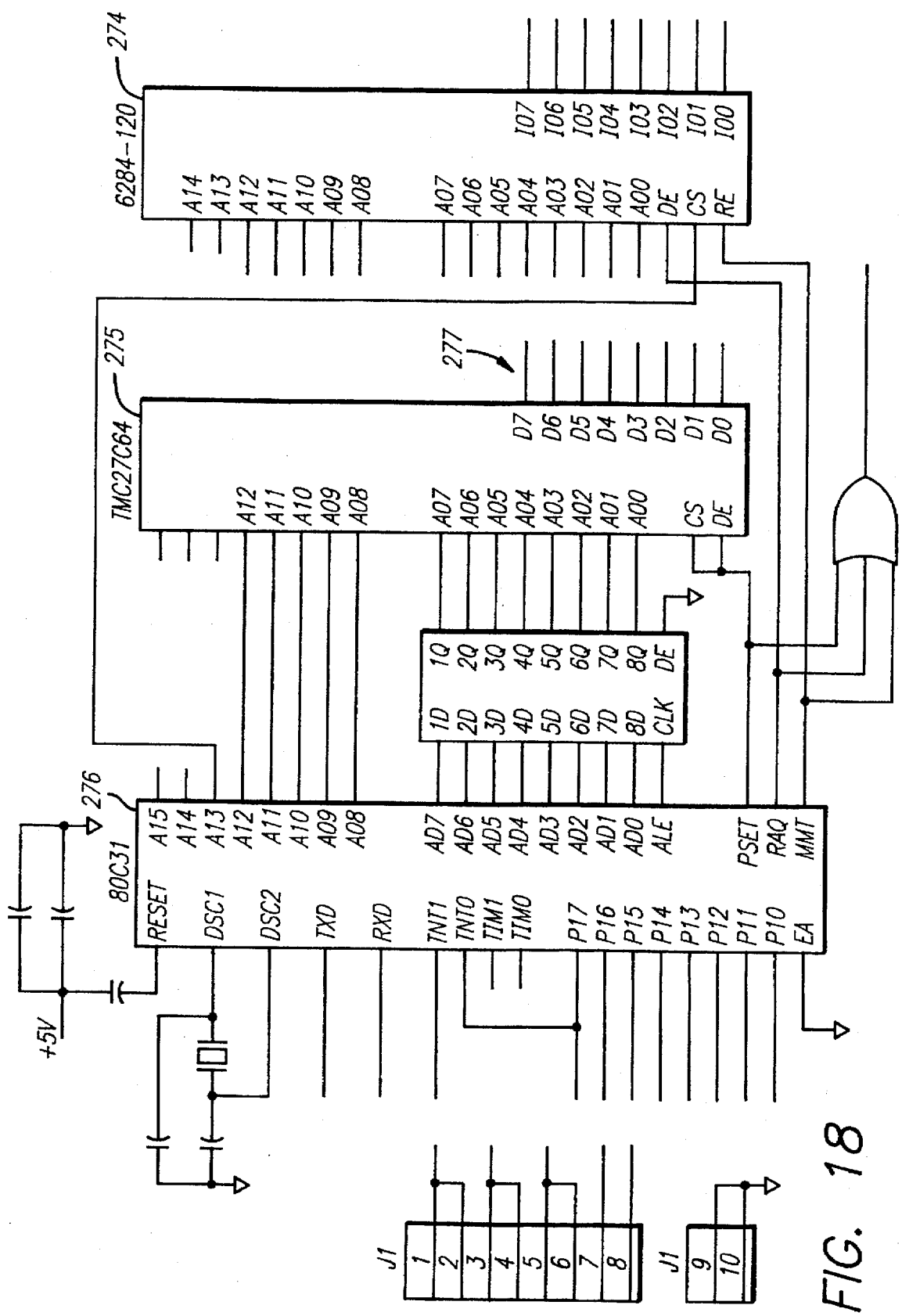
FIG. 18 is the schematic of the telephone interface showing the storage for voice data.

The memory containing the vocabulary for the voice synthesizer is capable of storing a plurality of words, preferably up to 111 words, as contained in the ROM chip 275 as schematically illustrated in FIG. 18. The ROM 275 is controlled by chip 276 and outputs a signal along 277 to activate the voice synthesizer chips 274. Voice prompting is preferably employed to provide status information as to appliance availability and specific appliance status information. The voice synthesizer circuitry is capable of accepting and storing a variety of audio phrases, as well as providing means to generate new audio messages or modify existing audio phrases. For example, an interactive voice dialogue may be initiated with a message such as "Welcome to the Laundrimate Service." Current appliance status information may then be provided by a message such as "Five Washers and Five Dryers are Currently Available." If no machine is available, the system may indicate that "No Washer or Dryer is Currently Available" and may further prompt the user to "Enter Your Phone Keypad Number" thus allowing the user to reserve the next available appliance. When the user wishes to exit the service, the user may be prompted to "Enter Star to Exit the Laundrimate Service," and may further be provided with a final message such as "Thank You for Using Laundrimate." Further, the system is capable of calling back a user to provide appliance status information such as the availability of a washer or dryer, and the location of the available machine as well. In this regard, the system in accordance with the present invention is fully interactive, allowing the user to obtain appliance status information, to reserve a desired appliance, and to receive a message, via telephone or otherwise, that an appliance is available.

Figure 19:
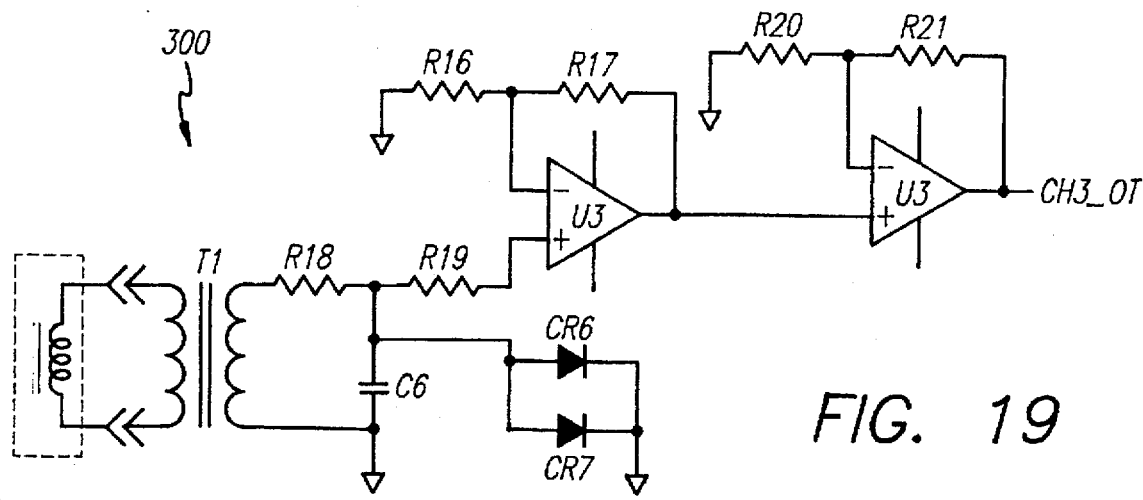
FIG. 19 is an electrical schematic of a preferred current transformer which is used to monitor current draw induced by operation of appliances.

FIG. 19 is an electrical schematic of a preferred current transformer 300 which is used to monitor current draw induced by operation of appliances.

Figure 20:
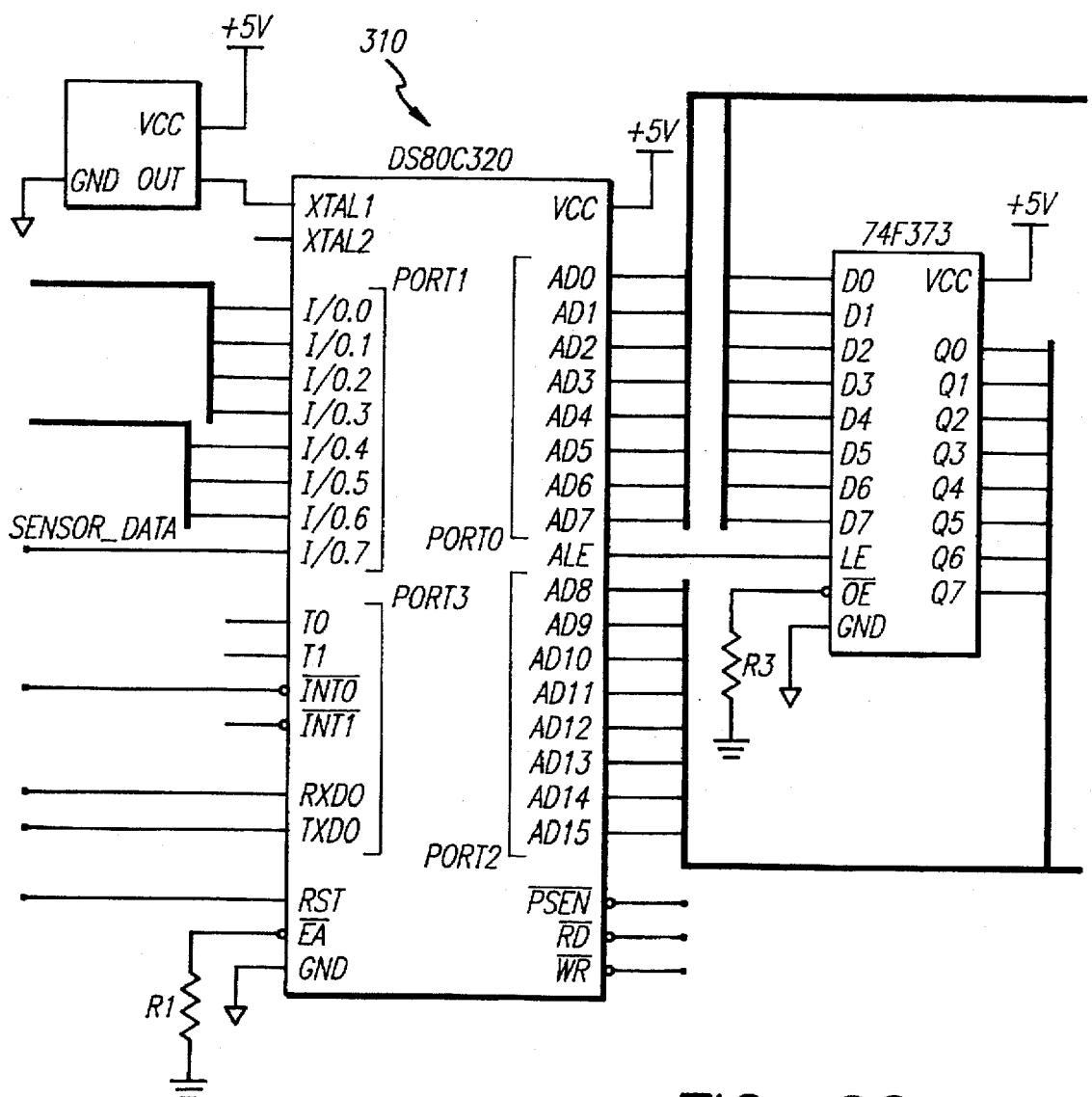
FIG. 20 is an electrical schematic of an alternative preferred controller including a reservation unit.

FIG. 20 is an electrical schematic of an alternative preferred controller 310 including a reservation unit which will be discussed below in greater detail.

Figure 21:
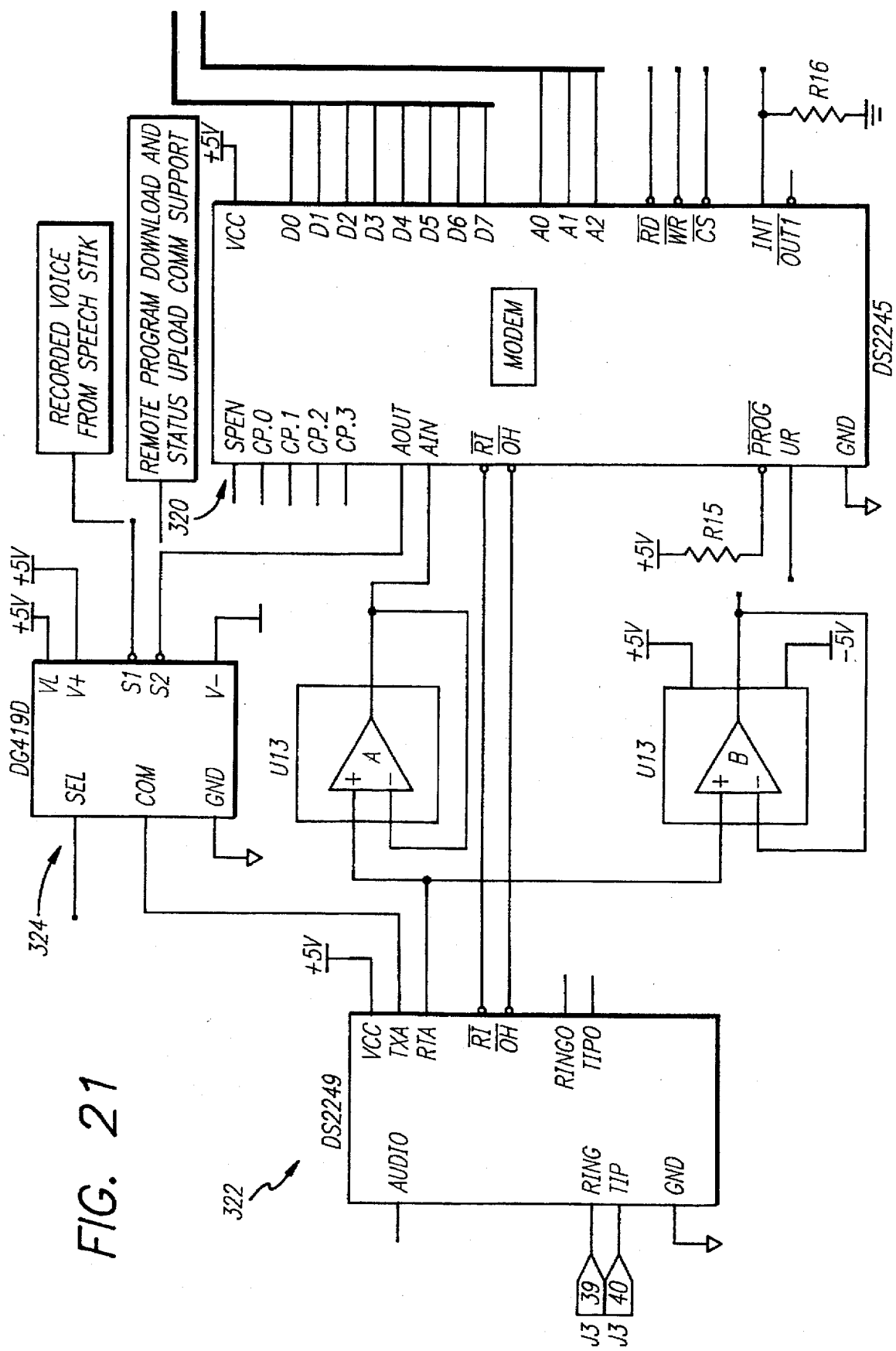
FIG. 21 is an electrical schematic of interface circuitry between the controller and a telephone line.

FIG. 21 is an electrical schematic of interface circuitry between the controller 310 and a telephone line. The interface circuitry includes a modem chip 320 connected as shown to a data access management chip 322. Additionally, the interface circuitry includes an analog impedance matching chip 324 connected as shown.

Figure 22:
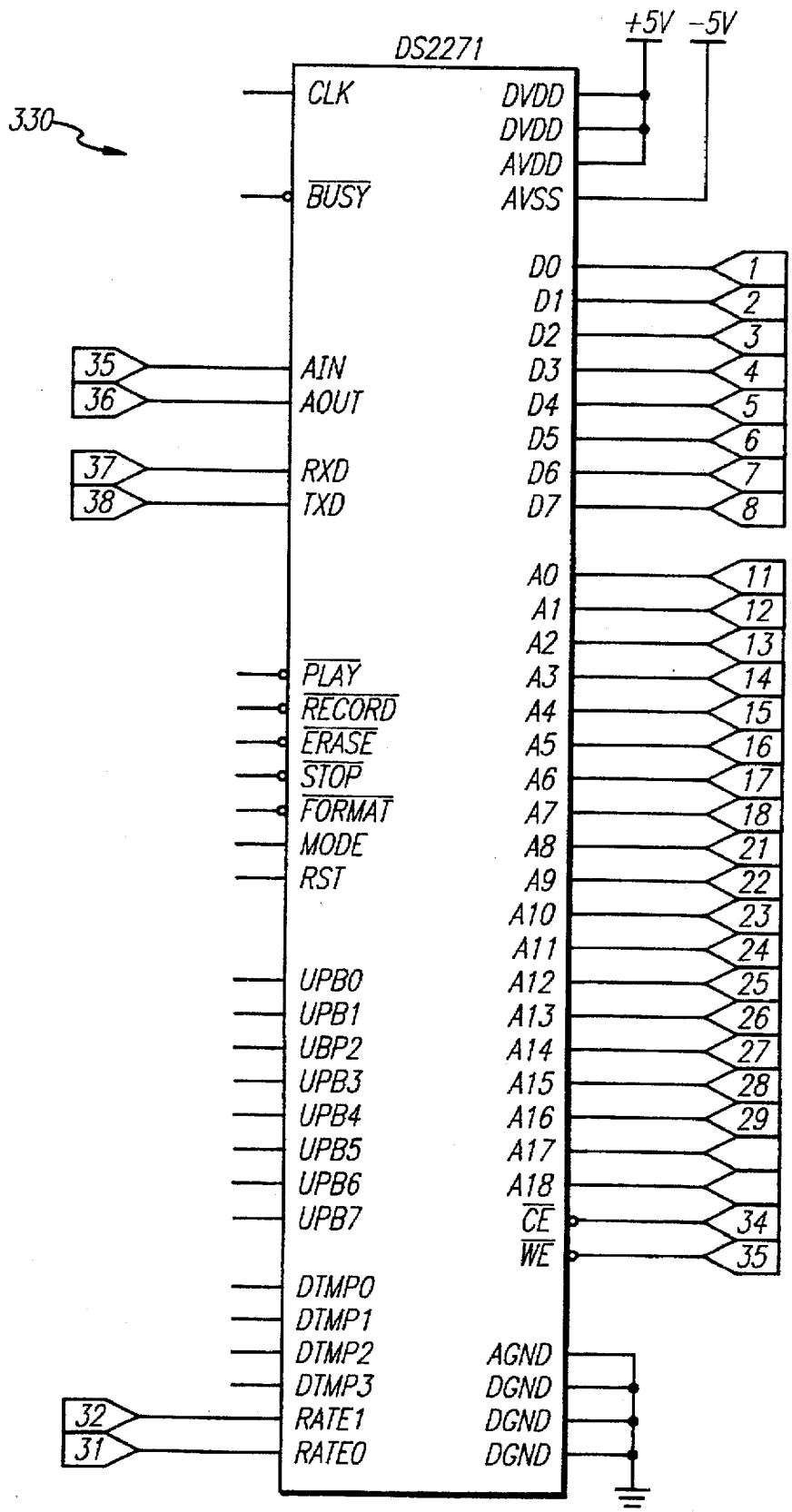
FIG. 22 is an electrical schematic of an alternative speech synthesis chip.

FIG. 22 is an electrical schematic of an alternative speech synthesis chip 330 which may be employed on a vector board.

A detailed discussion of controller and reservation unit software is provided below with reference to exemplary operational flow charts which comprise the remaining figures. Operational capabilities of a preferred status indicating system are embodied in the software routines and subroutines and, as may be readily appreciated, may be realized in the form of hardware, firmware, software or otherwise.

Figure 23:
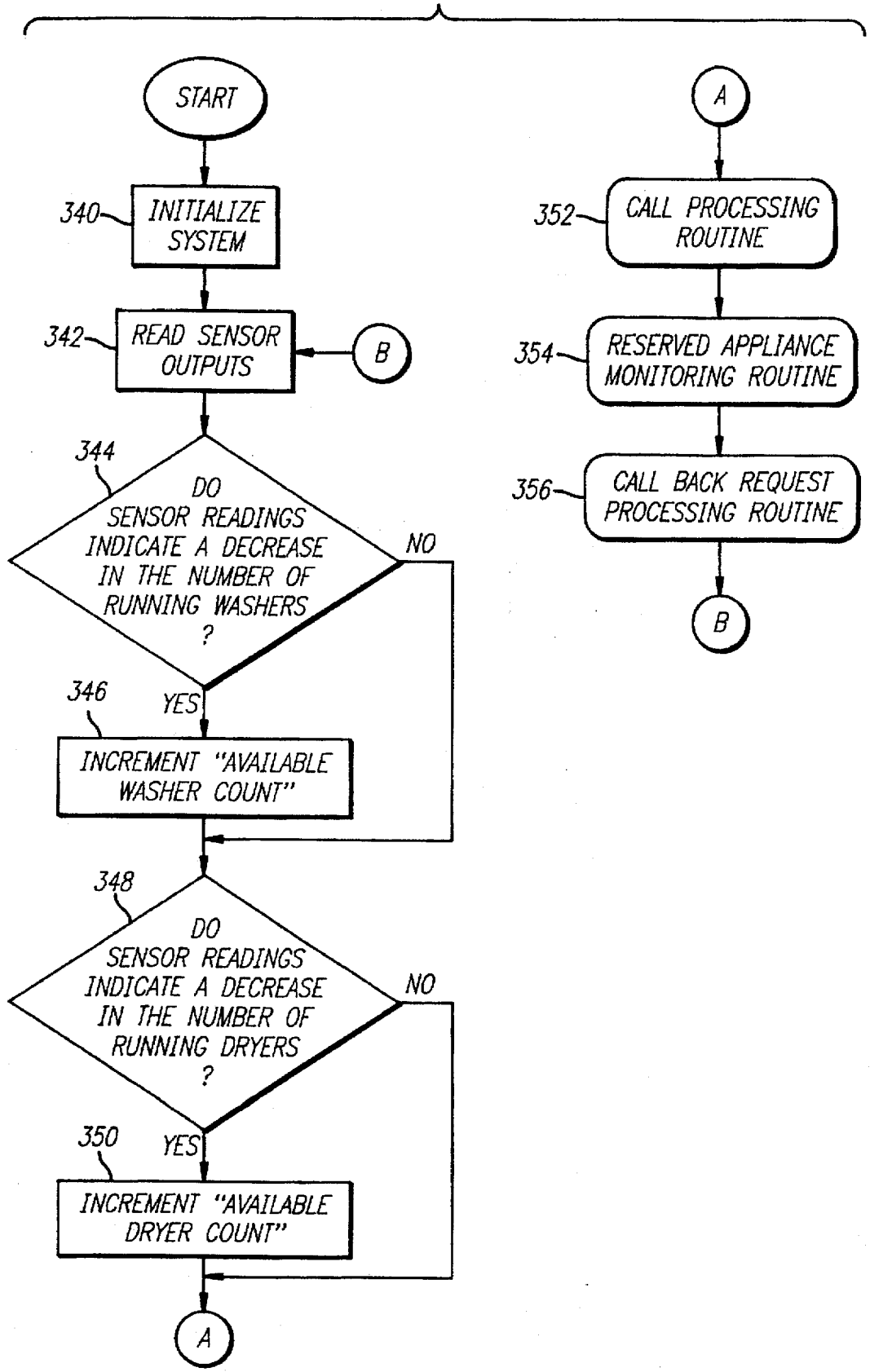
FIG. 23 is a flow chart of a washer/dryer usage monitor routine.

FIG. 23 is a flow chart of a washer/dryer usage monitor routine. After the system is initialized at block 340, the sensor outputs are read at executable block 342. Changes in measured currents indicate whether or not an appliance is operating and additionally can be used to determine what stage of operation a given appliance is in at a particular time when a current measurement is made. For example, a decrease in the current consumed by a dryer from full rated current consumption to zero current draw may indicate that the dry cycle has terminated.

At decisional diamond 344, the washer/dryer usage monitor routine determines whether or not sensor readings indicate a decrease in the number of running washers. If yes, an increase available washer count block 346 is executed. If not, the washer/dryer usage monitor routine is directed toward a decisional diamond 348 for determining whether or not sensor readings indicate a decrease in the number of running dryers. If yes, an increment available dryer count block 350 is executed.

Three additional software routines are included in the washer/dryer usage monitor routine: a call processing routine 352; a reserved appliance monitoring routine 354; and a call back request processing routine 356.

Figure 24:
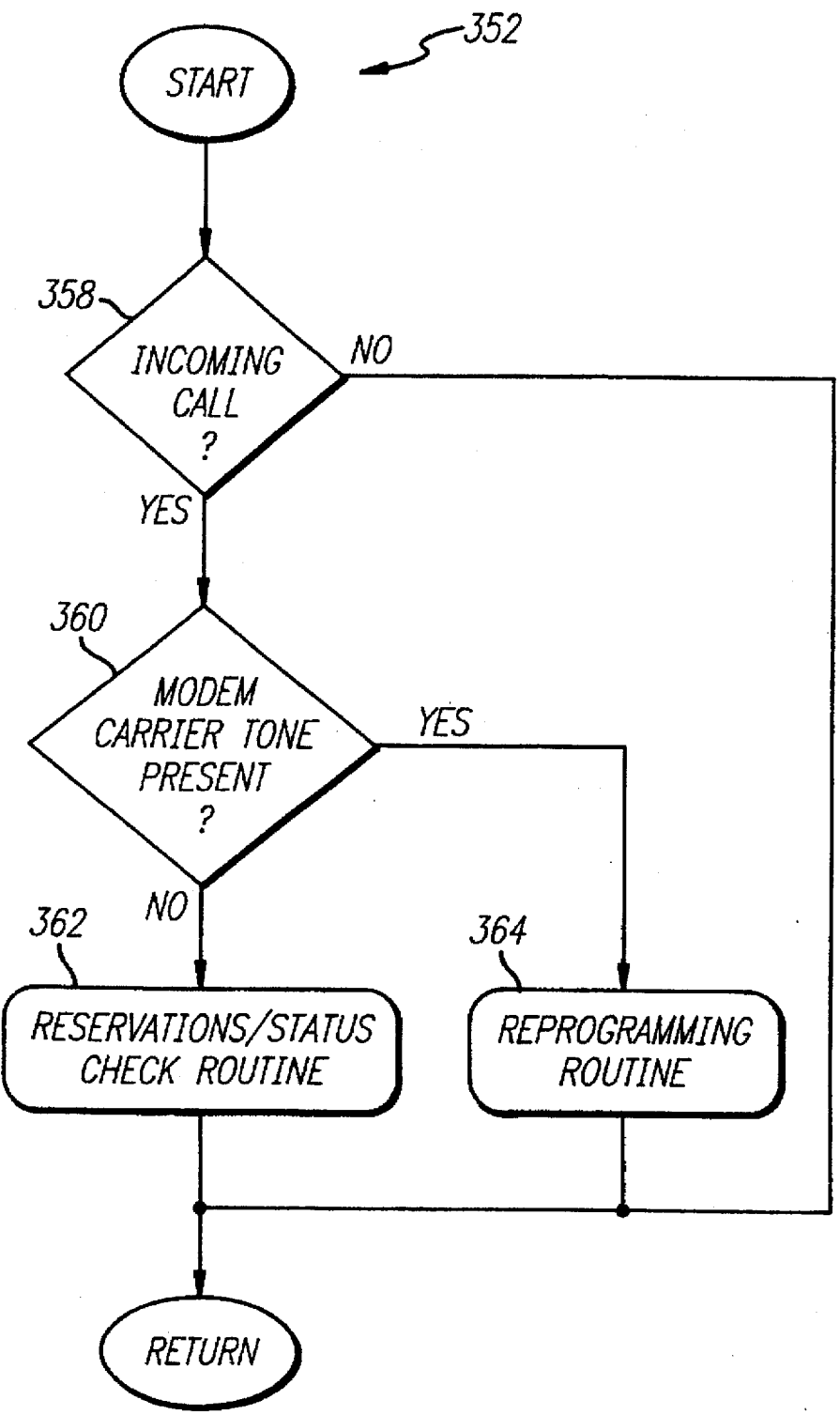
FIG. 24 is a flow chart of a call processing routine.

FIG. 24 is a flow chart of the call processing routine 352. Generally, the preferred embodiment represented by the flow charts includes remote transceivers which communicate with the controller via a telephone line and associated interface circuitry as discussed supra. The call processing routine differentiates between a touch-tone combination transmitted by a user from one of the remote transceivers and a modem carrier tone which may be used to indicate, for example, that the controller is to be remotely reprogrammed with new executable code or is to receive data via a modem or other interface device.

With reference to FIG. 24, a decisional diamond 358 determines whether or not an incoming call is present. If yes, another decisional diamond 360 determines whether or not a modem carrier tone is present. If not, the call processing routine is directed toward execution of a reservations/status check routine 362. If yes, a reprogramming routine 364 is executed. If no incoming call is present and after execution of the reservations/status check routine 362 or of the reprogramming routine 364, software execution is returned from the call processing routine to the washer/dryer usage monitor routine. Again, it should be understood that appliances other than washers and dryers are contemplated as being within the scope of the present invention.

Figure 25:
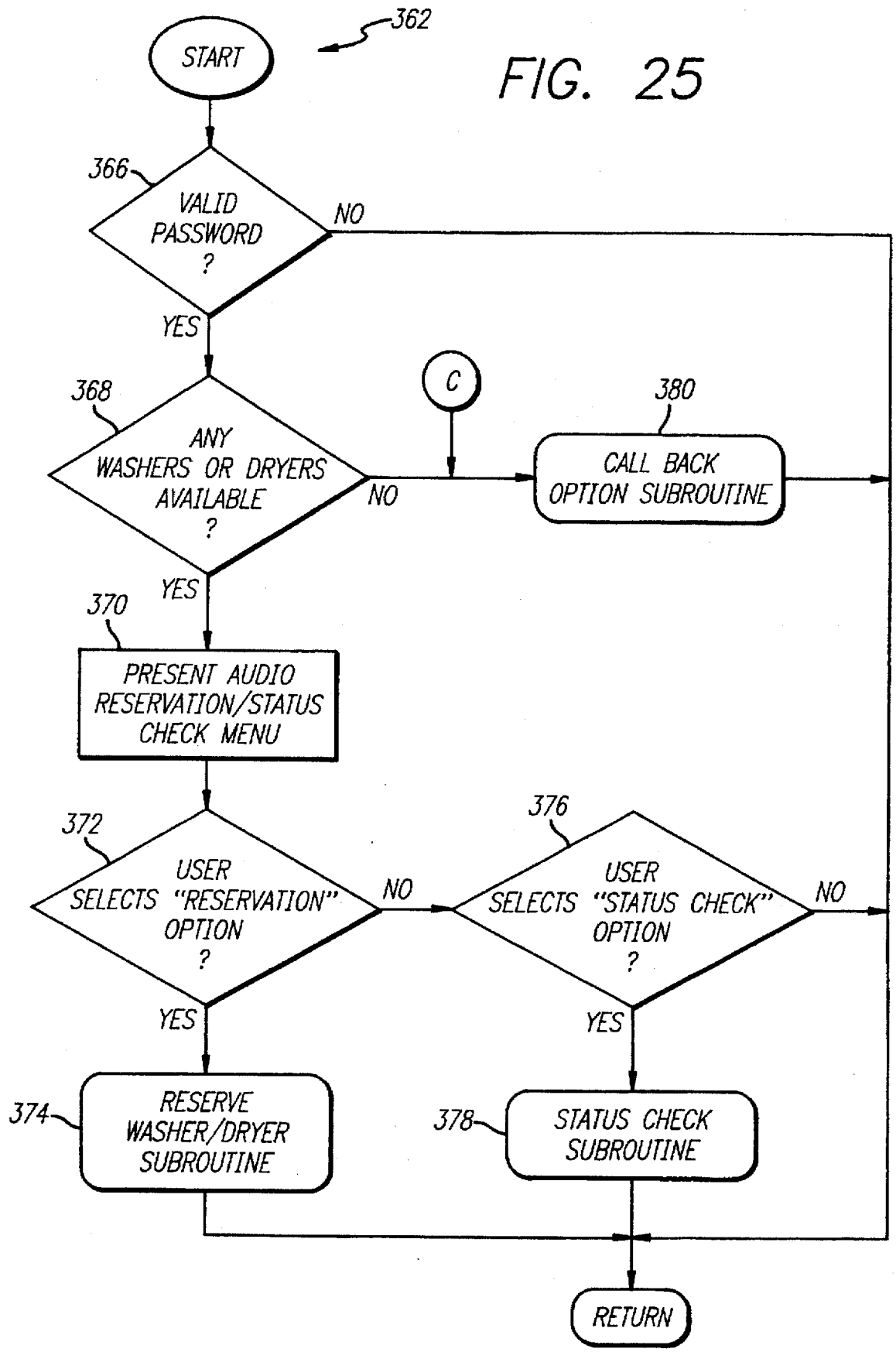
FIG. 25 is a flow chart of a reservation/status check routine.

FIG. 25 is a flow chart of the reservation/status check routine 362. Generally, a user may use a touch tone telephone to send an appliance status request signal, reserve an appliance and, when a particular type of appliance is unavailable, request a "call back". The appliance status request signal interrogates the controller so that an indication of appliance availability will be returned to the user. A call back is initiated by the controller under appropriate circumstances when one of the desired appliances becomes available for use.

Each remote transceiver or user is associated with a password. The validity of a password entered at a touch tone keypad is checked at decisional diamond 366. After the validity of the password is established, the reservation/status check routine determines whether or not any washers or dryers are available at decisional diamond 368. If yes, a present audio reservation/status check menu block 370 is executed.

In an exemplary audio reservation/status check menu, a pre-recorded or synthesized voice provides a number of options to the listener who then selects a desired option by pressing the appropriate touch tone key. The reservation/status check menu preferably includes a reservation option whereby the user can attempt to reserve an appliance for what may be, but is not necessarily, a predetermined and limited period of time. The reservation/status check routine responds to entered tones and determines at decisional diamond 372 whether or not the user selected the reservation option. If yes, the reservation/status check routine is directed toward execution of a reserve washer/dryer subroutine 374. If not, a decisional diamond 376 determines whether or not the user selected a status check option from the audible menu. If yes, a status check subroutine 378 is then executed. When no washers or dryers are available, the reservation/ status check routine is directed toward a call back option subroutine 380. When no valid password is provided and after execution of either of the subroutines 374, 378, 380, the reservation/status check routine returns to the call processing routine.

Figure 26:
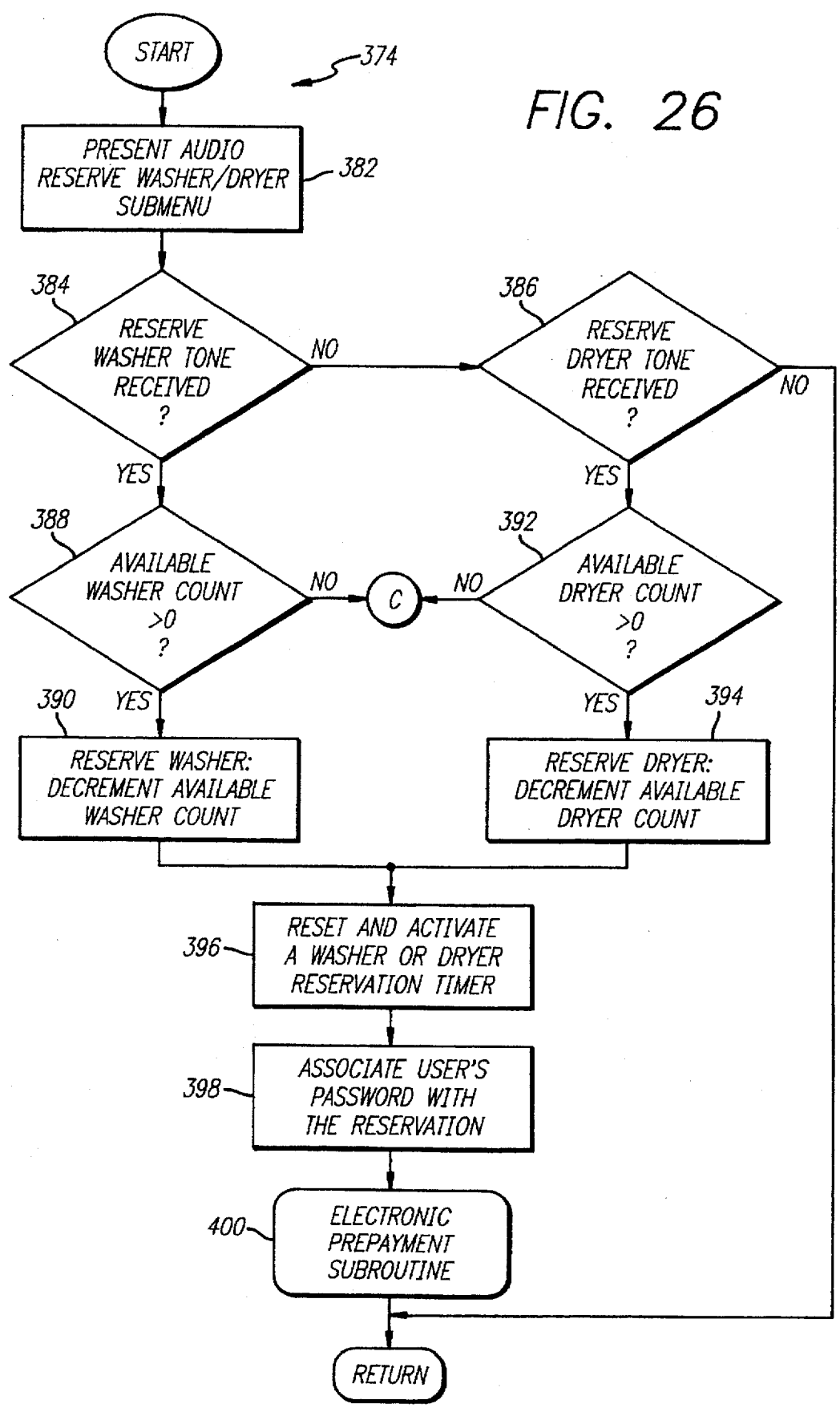
FIG. 26 is a flow chart of a reserve washer/dryer subroutine.

FIG. 26 is a flow chart of the reserve washer/dryer subroutine 374. At executable block 382, an audio submenu is presented providing various options pertaining to the reservation of appliances for later use. A preferred reserve washer/dryer submenu prompts the listener to press different touch tone keys depending upon whether a washer or dryer is to be reserved. Accordingly, a decisional diamond 384 determines whether or not a reserve washer tone has been received. If not, a decisional diamond 386 determines whether or not a reserve dryer tone has been received. A storage device of the controller is used to maintain available washer and dryer counts. If the available washer count is greater than zero (i.e., at least one washer is available for use), a decisional diamond 388 directs execution of the reserve washer/dryer subroutine to an executable block 390. If the available dryer count is greater than zero (i.e., at least one dryer is available for use), a decisional diamond 392 directs execution of the subroutine to an executable block 394. If a negative determination is made at either decisional diamond 388, 392, software execution is directed to the call back option subroutine 380, a detailed discussion of which is deferred until later.

The executable block 390 is used to reserve a washer. No particular washer is reserved, rather the software designates a washer as being reserved by decrementing an available washer count. Similarly, block 394 reserves a dryer and decrements an available dryer count software variable.

A reset and activate a washer or dryer reservation timer block 396 is next executed. One or more software appliance reservation timers may be set by the reserve washer/dryer subroutine as reservation requests are received and processed. Preferably, each reservation is maintained for only a limited period of time thereby preventing excessive lost revenues from users who reserve an appliance and then later decide not to use it. After a timer is reset and activated, the password of the user is associated with the reservation made by the user at block 398. Such a reservation/password association is not essential in all embodiments of the present invention but is useful in the present embodiment for limiting the inputs to which the controller will respond to those inputs originating from a specified user. After execution of block 398, an electronic prepayment subroutine 400 is executed before returning to the reservation/status check routine.

Figure 27:
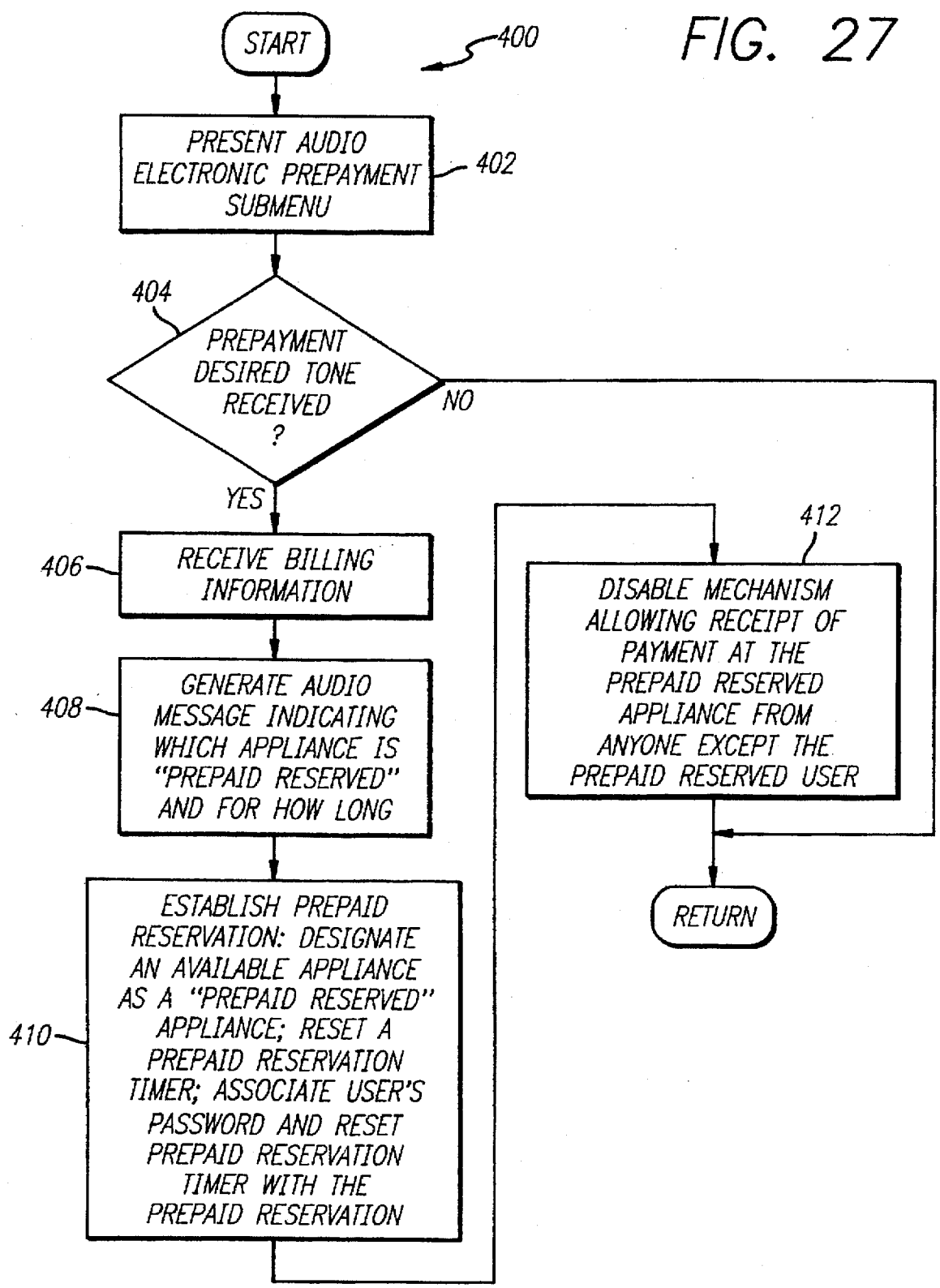
FIG. 27 is a flow chart of an electronic prepayment subroutine.

FIG. 27 is a flow chart of the electronic prepayment subroutine 400. A preferred condition responsive indicating system may be implemented to facilitate prepayment for accepted reservations via the remote communication link in addition to facilitating appliance reservations. At block 402, the listener is presented with an audible electronic prepayment submenu providing various options. For example, the user may be prompted to indicate by selecting appropriate touch tone keys what the method of electronic payment will be (e.g., credit card number, ATM password, etc.). The electronic prepayment subroutine determines whether or not the user desires to electronically prepay for a reservation at decisional diamond 404. If a tone indicating an affirmative response is received, the user is prompted for additional billing information which is received at executable block 406. Next, the electronic prepayment subroutine generates an audio message at executable block 408 indicating which specific appliance (e.g., washer #2) is "prepaid reserved".

When a reservation is prepaid, the sensor outputs —which are time tagged with reference to a controller clock —are used to identify a particular appliance as being available for "prepaid reserved" status. Such a prepaid reservation may or may not expire after a predetermined period of time. If a prepaid reservation expires, the controller preferably stores this information for providing the user with a refund. After the foregoing audio message is generated at executable block 408, the controller establishes the prepaid reservation at executable block 410. More specifically, the controller designates an available appliance as a "prepaid reserved" appliance, resets a prepaid reservation timer, and associates the password of the user and the reset prepaid reservation timer with the prepaid reservation. Thereafter, an executable block 412 disables the mechanism allowing receipt of payment at the prepaid reserved appliance from anyone except the prepaid reserved user. As shown in FIG. 1, the unit 26 is electrically connected via line 44 to the appliances and includes a keyboard 38 at which the prepaid reserved user may enter a password to initiate the appliance cycle. If the listener does not wish to prepay for a reserved washer or dryer, the electronic prepayment subroutine returns to the reserve washer/dryer subroutine.

Figure 28:
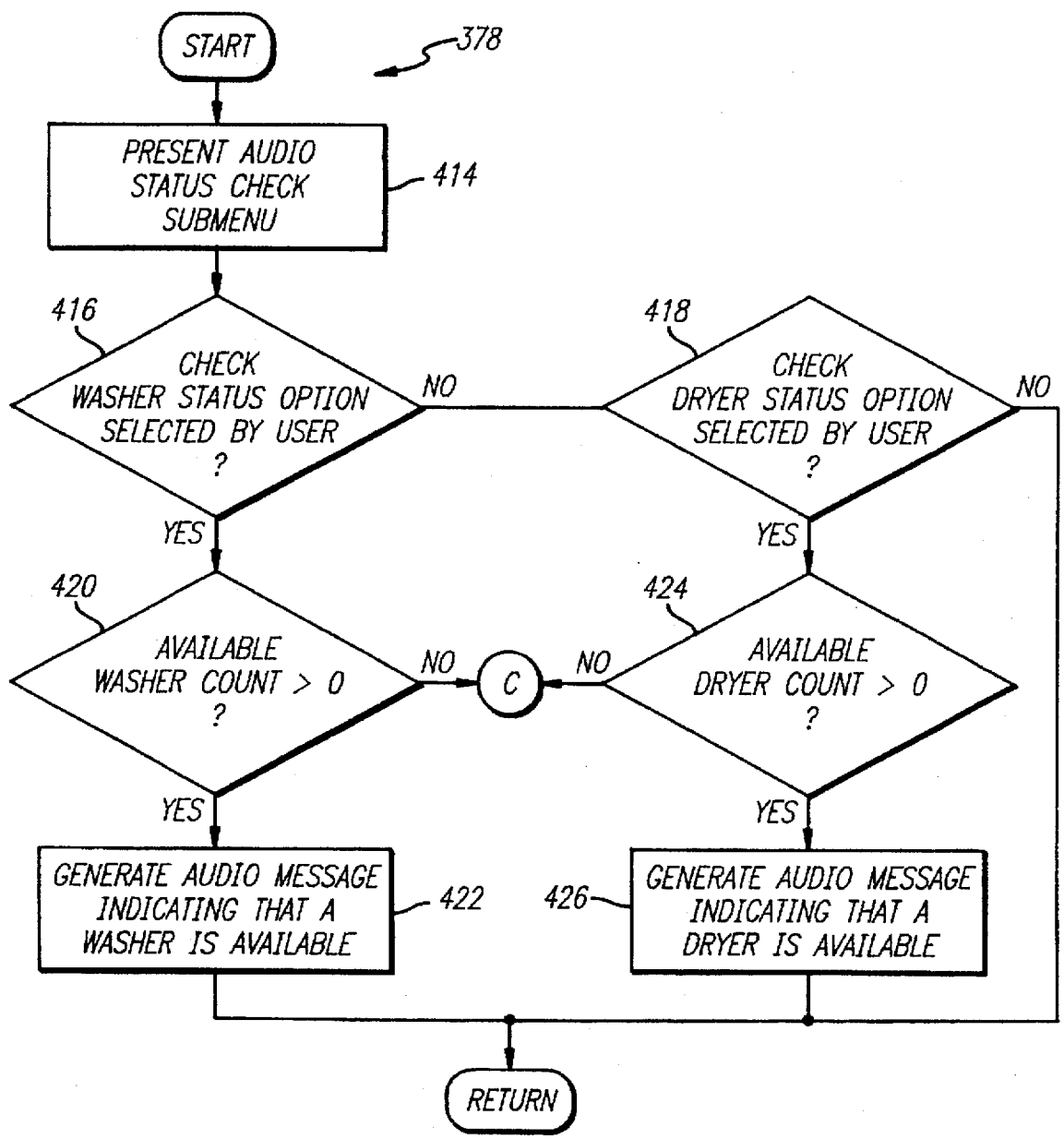
FIG. 28 is a flow chart of a status check subroutine.

FIG. 28 is a flow chart of the status check subroutine 378. A listener may wish to determine whether or not appliances are available rather than first try to make a reservation without knowing about the availability of a particular type of appliance. The status check subroutine begins at executable block 414 where an audio status check subroutine is presented to the listener. For example, the status check submenu may provide the user with the choices of checking washer or dryer availability statuses. At decisional diamond 416, the status check subroutine determines whether or not the user has selected a check washer status option from the submenu. If not, the subroutine determines at decisional diamond 418 whether or not the user has selected a check dryer status option from the submenu. If an affirmative determination is made at decisional diamond 420, a generate audio message indicating that a washer is available block 422 is executed. If an affirmative determination is made at decisional diamond 424, a generate audio message indicating that a dryer is available block 426 is executed. If a negative determination is made at either decisional diamond 420, 424, the status check subroutine redirects software execution to the call back option subroutine 380 as shown in FIG. 25. Further with regard to FIG. 28, the status check subroutine returns to the reservation/status check routine after execution of either block 422, 426 or if the user does not select an available option from the status check submenu.

Figure 29:
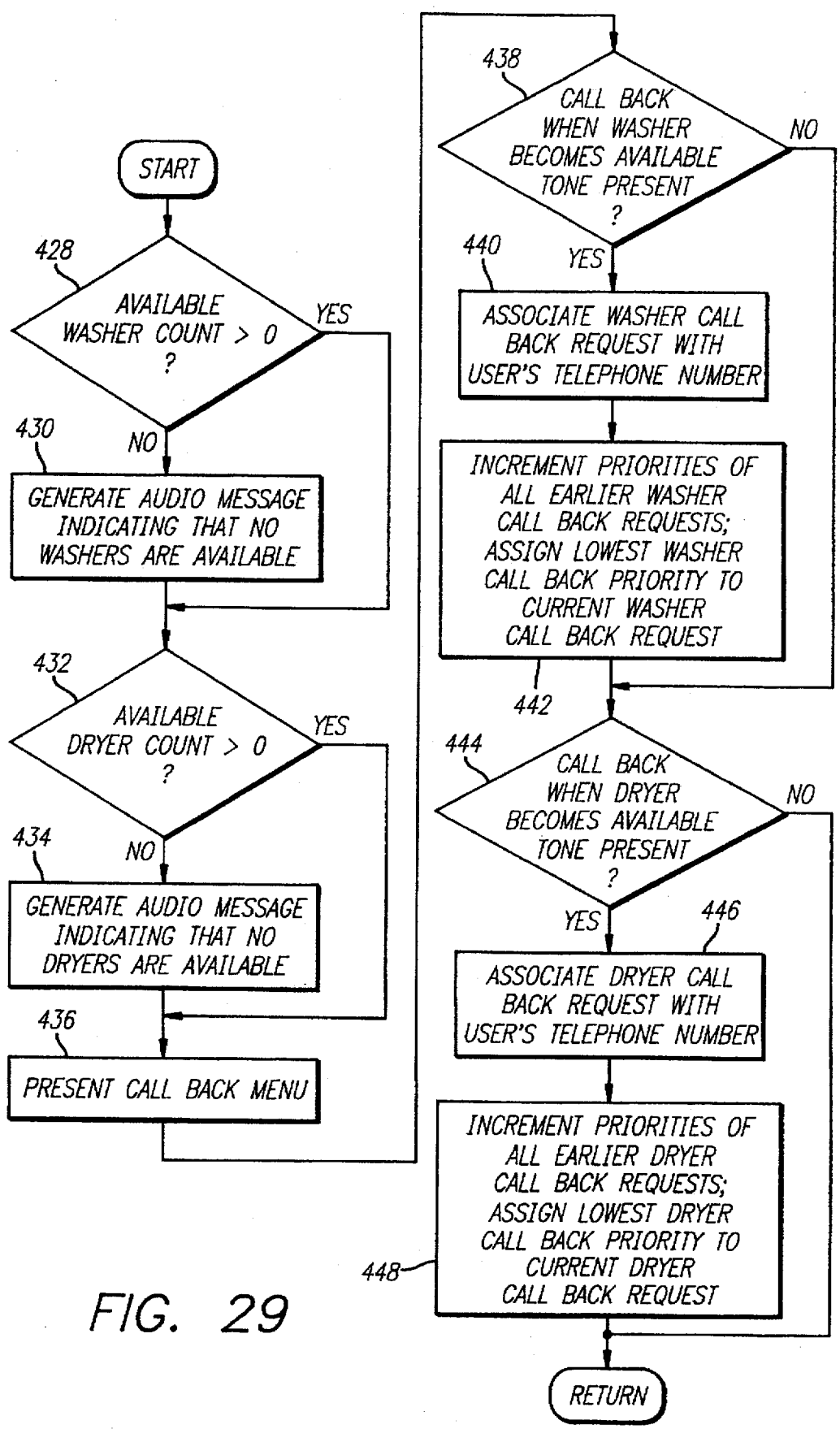
FIG. 29 is a flow chart of a call back option subroutine.

FIG. 29 is a flow chart of the call back option subroutine 380. Generally, this subroutine indicates to the user when desired appliances are unavailable for use and gives the user an opportunity to request that the controllers call back the user when such an appliance does become available for use. If a determination is made at decisional diamond 428 that no washers are available, a generate audio message indicating that no washers are available block 430 is executed. If a determination is made at decisional diamond 432 that no dryers are available for use, a generate audio message indicating that no dryers are available block 434 is executed. After the appropriate audible message is generated, a call back menu is presented to the listener at executable block 436.

If the call back option subroutine determines at decisional diamond 438 that a call back when washer becomes available tone is present, an associate washer call back request with users telephone number block 440 is executed.

Preferably, call back requests are responded to in the order that they are received and accordingly are assigned priority values. The call back option subroutine therefore increments priorities of all earlier washer call back requests and assigns a lowest washer call back priority to the current washer call back request at executable block 442.

Similarly, the user may desire to receive a call back when a dryer becomes available. If it is determined at decisional diamond 444 that a call back when dryer becomes available tone is present, an associate dryer call back request with user's telephone number block 446 is executed. Thereafter, executable block 448 increments priorities of all earlier dryer call back requests and assigns a lowest dryer call back priority to the current dryer call back request before returning to the reservation/status check routine.

Figure 30:
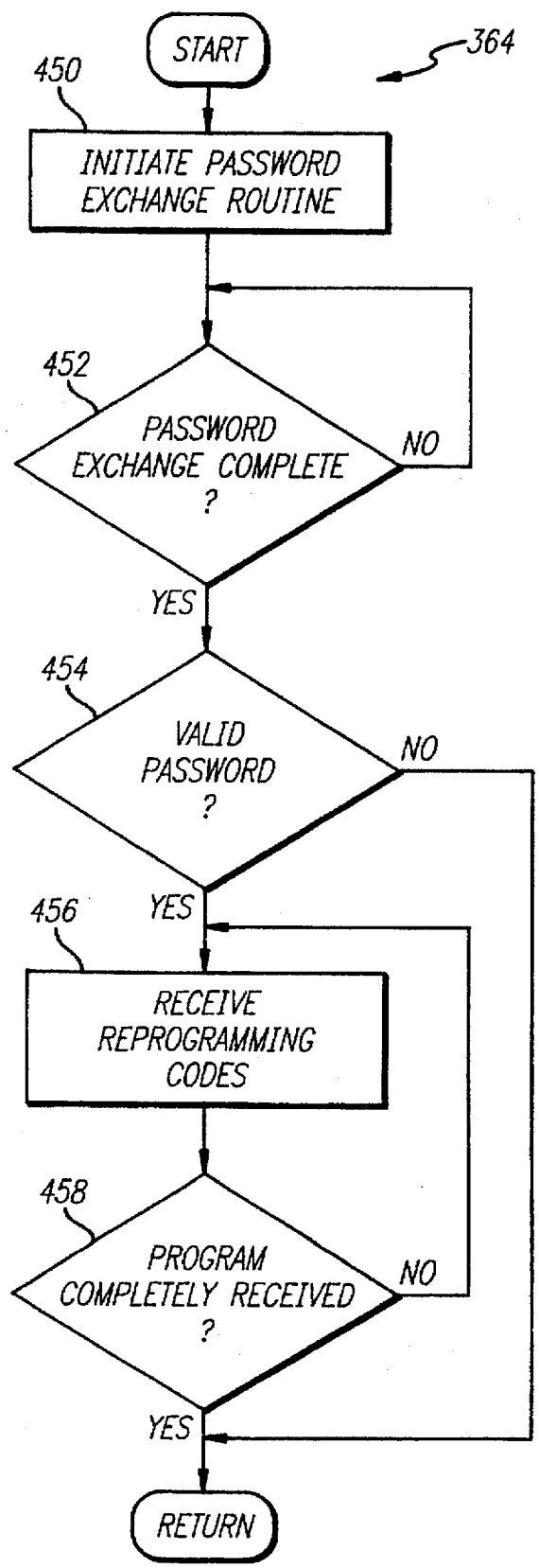
FIG. 30 is a flow chart of a reprogramming routine.

FIG. 30 is a flow chart of the reprogramming routine 364. An initiate password exchange routine block 450 is first executed. A password exchange routine proceeds until a decisional diamond 452 determines that the password exchange is complete. If the password is determined to be valid at decisional diamond 454, a receive programing codes block 456 is then executed. After the reprogramming routine determines at decisional diamond 458 that the program has been completely received, software execution is returned to the call processing routine. The reprogramming routine allows software and other data within the controller to be remotely reprogrammed or modified as desired.

Figure 31:
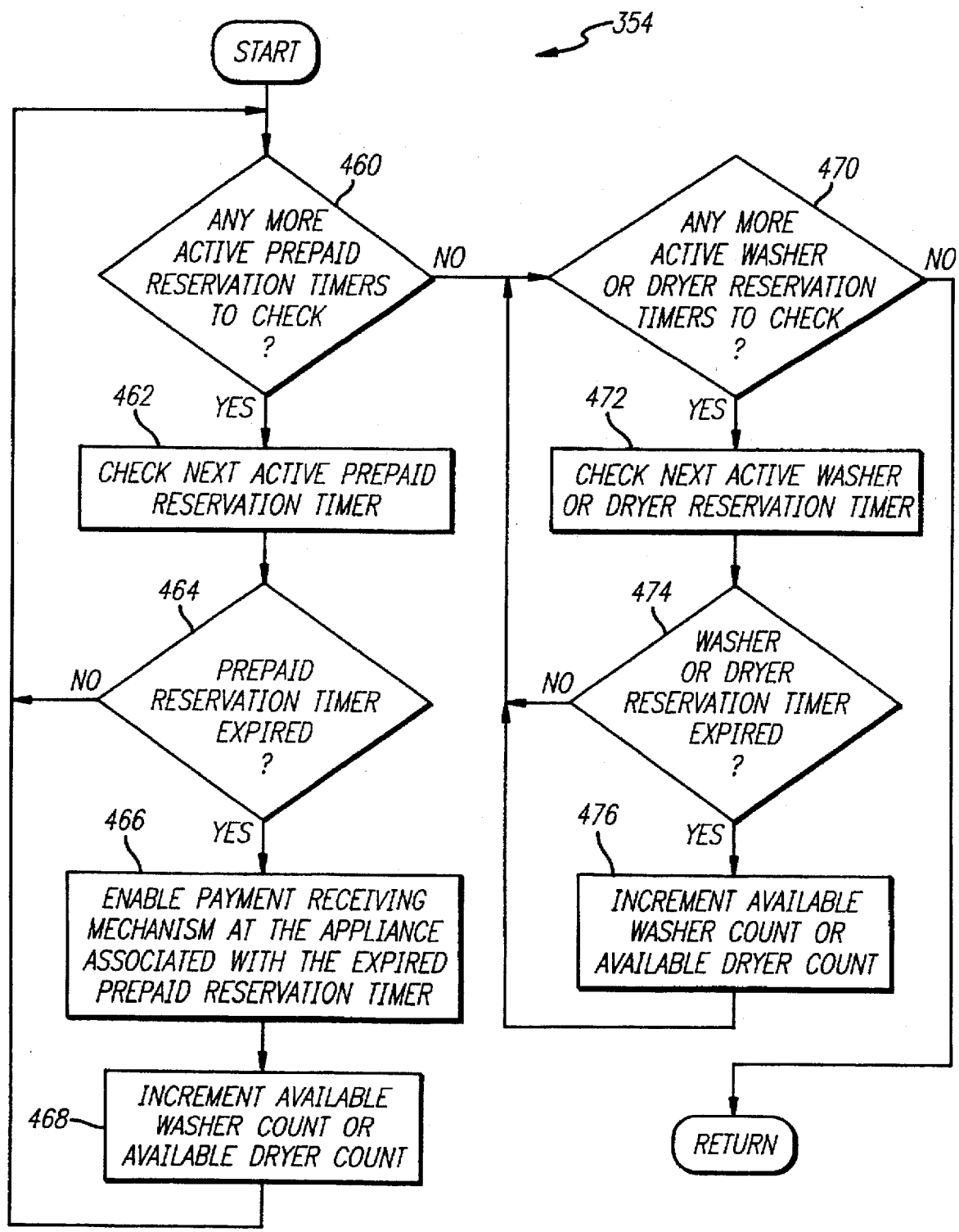
FIG. 31 is a flow chart of a reserved appliance monitoring routine.

FIG. 31 is a flow chart of the reserved appliance monitoring routine 354. Generally, this routine monitors software timers to determine whether or not reservations have expired and, if so, appropriately increments software counters indicating numbers of appliances available. A decisional diamond 460 is employed to determine if the reserved appliance monitoring routine has any more active prepaid reservation timers to check. If yes, a check next active prepaid reservation timer block 462 is executed. If that prepaid reservation timer has expired, the reserved appliance monitoring routine is directed toward an executable block 466. If the prepaid reservation timer has not yet expired, execution of the software is returned to the decisional diamond 460.

At executable block 466, the reserved appliance monitoring routine enables the payment receiving mechanism at the appliance associated with the expired prepaid reservation timer. Next, an increment available washer count or available dryer count block 468 is executed.

Distinct software timers are employed for prepaid and non-prepaid reservations in the preferred embodiment illustrated in FIG. 31. Next, the reserved appliance monitoring routine checks the active washer and dryer reservation timers which are associated with non-prepaid reservations. At decisional diamond 470, the reserved appliance monitoring routine determines whether or not any more active washer or dryer reservation timers remain to be checked. If yes, the next active washer or dryer reservation timer is checked at executable block 472. If a determination is made at decisional diamond 474 that the washer or dryer reservation timer has expired, an increment available washer count or available dryer count block 476 is executed. After all active washer and dryer reservation timers have been checked, software execution is returned to the washer/dryer usage monitor routine as shown in FIG. 23.

Figure 32A:
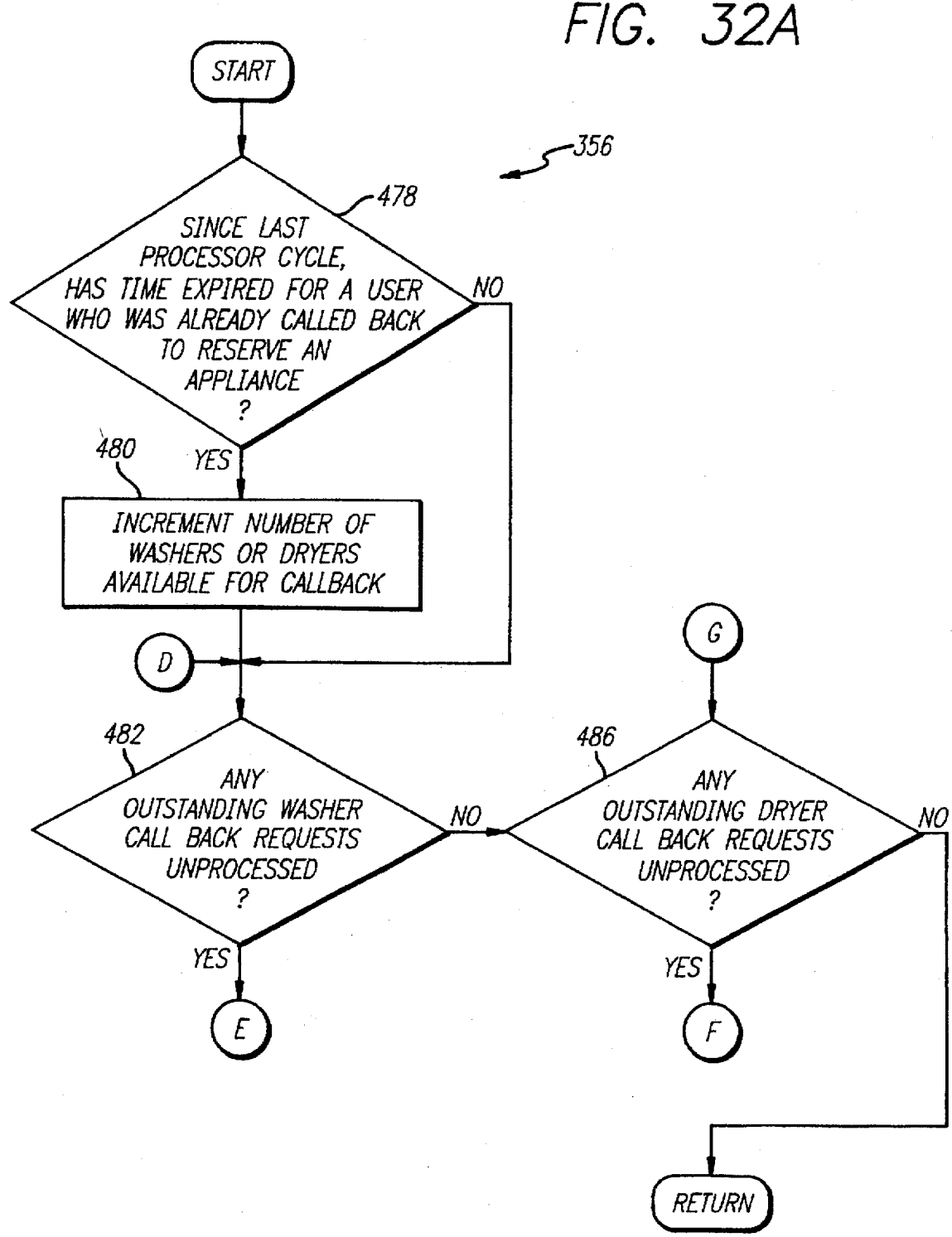
FIGS. 32A, 32B, 32C are a flow chart of a call back request processing routine.
Figure 32B:
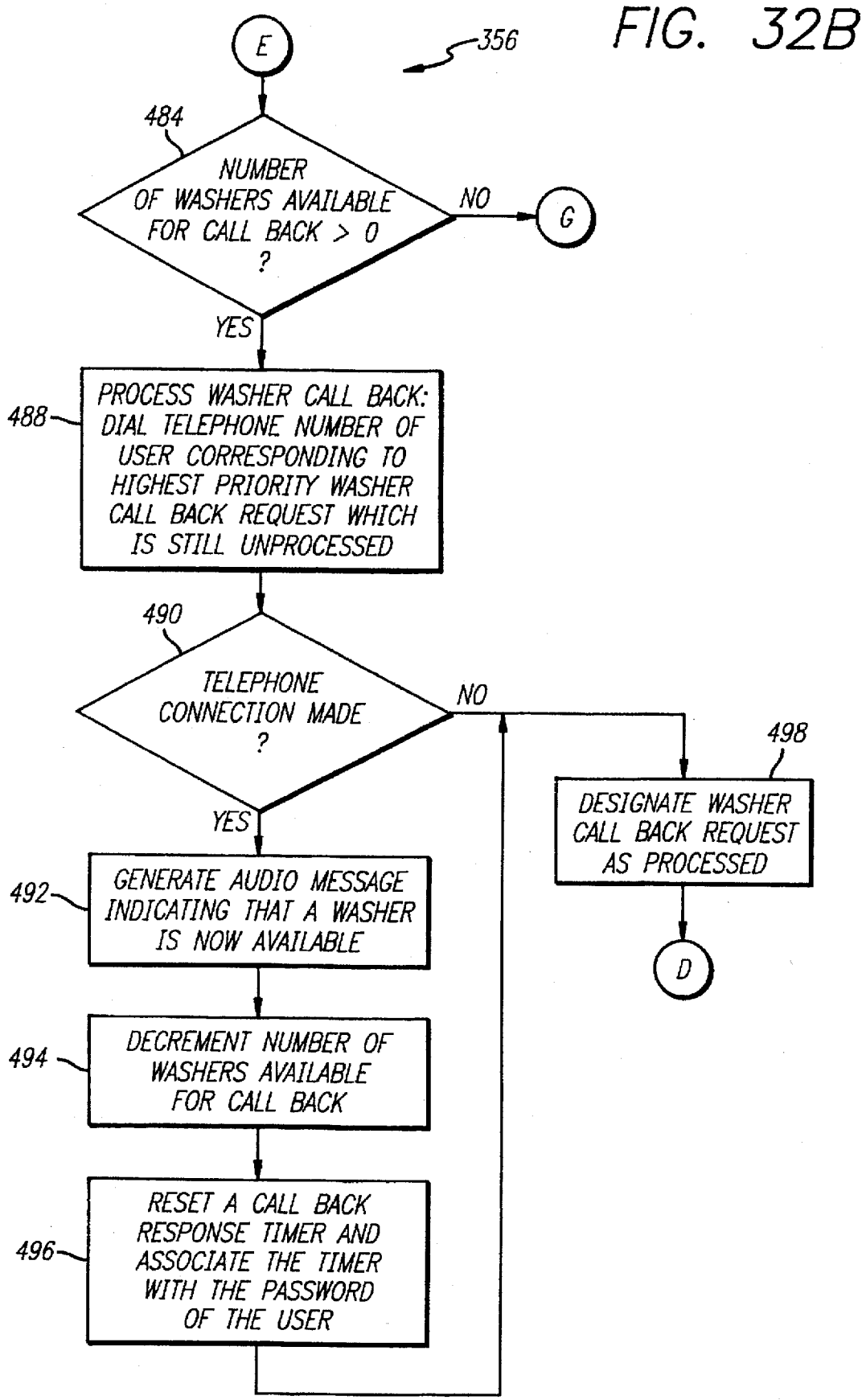
Figure 32C:
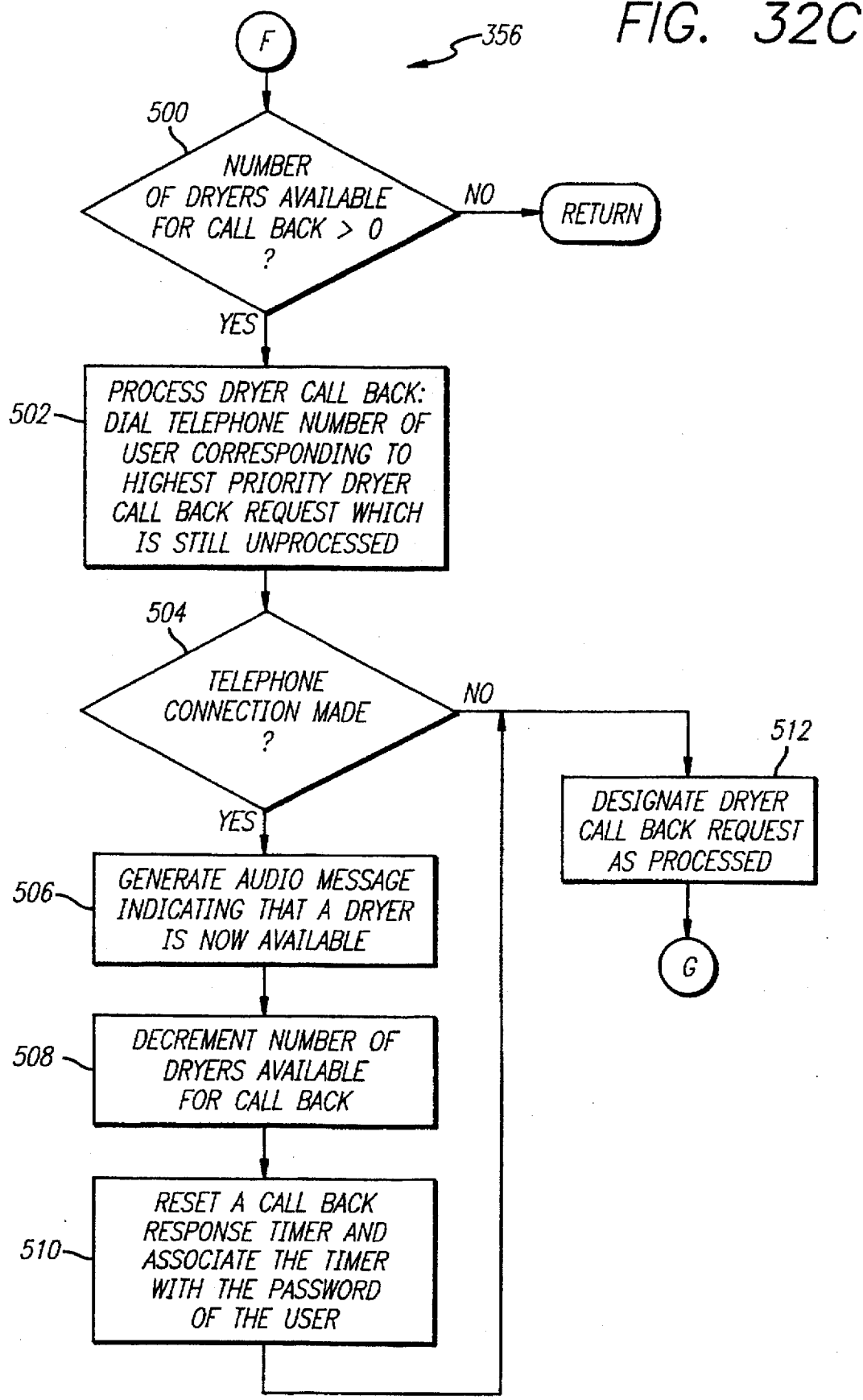

FIGS. 32A, 32B, 32C are a flow chart of the call back request processing routine 356. At a decisional diamond 478, the call back request processing routine determines for every processor cycle, whether or not time has expired for a user who has already called back to reserve an appliance. If yes, an increment number of washers or dryers available for call back block 480 is executed. Essentially, the call back request processing routine reduces the number of washers or dryers which it considers to be available for call back at least temporarily thereby giving users who have been called back an opportunity to reserve the requested appliance before other prospective users are given that opportunity.

The remainder of the call back request processing routine illustrates that the execution of call backs is governed depending upon a number of factors including the number of washers and dryers "available for call back".

At decisional diamond 482, the call back request processing routine determines whether or not any outstanding washer call back requests remain unprocessed. If yes, the routine determines whether or not any washers are available for call back at decisional diamond 484. If not, the call back request processing routine advances to a decisional diamond 486 where a determination is made as to whether any outstanding dryer call back requests remain unprocessed.

With reference to FIG. 32B, a washer call back request is processed if washers are available for call back as determined by the decisional diamond 484. An executable block 488 then dials the telephone number of the user corresponding to the highest priority washer call back request which is still unprocessed. If a telephone connection is successfully made at decisional diamond 490, a generate audio message indicating that a washer is now available block 492 is executed. Thereafter, the number of washers available for call back is decremented at executable block 494. Additionally, a reset a call back response timer and associate the timer with the password of the user block 496 is executed. After blocks 492, 494, 496 are executed or if no telephone connection is successfully made, a designate washer call back request as processed block 498 is executed.

With reference to FIG. 32C, outstanding dryer call back requests are processed in substantially the same manner as outstanding washer call back requests. If dryers are available for call back, a decisional diamond 500 directs further execution of the call back request processing routine to an executable block 502. If not, software execution is returned to the washer/dryer usage monitor routine. A dryer call back request is processed at block 502 dialing the telephone number of the user corresponding to the highest priority dryer call back request which is still unprocessed. If the routine determines at a decisional diamond 504 that a telephone connection has been successfully made, a generate audio message indicating that a dryer is now available block 506 is executed. Thereafter, a decrement number of dryers available for call back block 508 is executed. The call back request processing routine then resets a call back response timer and associates the timer with the password of the user at executable block 510. After execution of the blocks 506, 508, 510 or if no telephone connection is successfully made, a designate dryer call back request as processed block 512 is executed.

Many different forms of the invention exist, each differing from the other in matters of detail only. For instance, instead of having only a single utility room 11, it is possible in large complexes of condominiums or said apartments to have several first locations or utility rooms 11. In this manner, different groups of receiving apartments or condominiums can be connected with different selected first locations in the condominium complex. Also, in different situations, it may be necessary to provide for a jump cable 200 or connection whereby an AC power circuit dedicated to a particular group of living quarters can be cross-connected to a utility room 201 wired into a different power circuit.

In some embodiments, the receiver means and the transmission means can be easily retrofitted into existing structures. Here, it would be necessary to connect all the appliances through a new outlet plate 19 formed as described to serve the structure of the appliances and act as a transmission means. In each living quarter, there could be located an appropriate mating receiver means to effect the communication link.

In other embodiments, the receiver can be part of a personal computer system. Alternatively, there can be a screen dedicated to the system wherein the screen can indicate the various data as transmitted with the transmission means. In a personal computer configuration format, a keyboard can be used to input instructions to the receiver.

In other forms, the receiver can indicate the change of cycle, for instance, from washing to spinning of an appliance. In this manner, progress of an appliance can be monitored remotely.

Changes in the form and proportion of the elements described are possible without departing from the spirit or scope of the invention which is defined solely in the following claims.

We claimed is:

1. A condition responsive indicating system for interactively indicating status of a plurality of electrical appliances, comprising:

a controller for sensing an operational status parameter of each of the appliances and generating and transmitting status signals corresponding thereto and for determining an appliance availability status signal, said controller further comprising means for generating and transmitting a user prompt for interactively prompting a user to provide a user input; and a plurality of remote transceivers, each including:

means for receiving the user prompt and providing an indication thereof to the user:

means for receiving the user input;

a transmitter for generating and transmitting at least one interrogation signal including an appliance status request signal and a call back request signal only in response to the user input, the at least one interrogation signal causing said controller to transmit the status signals;

a receiver for receiving the status signals; and an indicator for producing an indication of the status signals;

the controller transmits, in response to the call back request signal and depending upon the appliance availability status signal, a call back to the remote transceiver from which the call back request signal was transmitted.

2. A system as in claim 1, in which:

the controller generates said status signals in the form of synthesized voice; and the indicator comprises an audio annunciator.

3. A system as in claim 1, in which the appliances include laundry washing and drying machines.

4. A system as in claim 1, in which:

each appliance has a predetermined cycle of operation; and said status parameter comprises at least one of a length of time elapsed in said cycle and a length of time remaining in said cycle.

5. A system as in claim 1, in which said status parameter includes at least one of electrical power. consumption, electrical current consumption, electrical voltage and operating temperature.

6. A system as in claim 1, in which each transceiver further comprises a keyboard for controlling the transmitter.

7. A system as in claim 1, in which the controller further comprises:

sensor means for periodically sensing said status parameters of each of said appliances; and a memory for storing and updating said status parameters upon sensing thereof by the sensor means.

8. A system as in claim 1, in which the controller further comprises means for enabling each transceiver to access only predetermined appliances.

9. A system as in claim 1, in which the controller assigns a priority ranking to each call back request signal and process each call back request signal and process each call back request signal depending upon its priority to generate the call back.

10. A system as in claim 7, in which the controller comprises means for addressing said status signals only to transceiver from which said interrogation signal was received.

11. A system as in claim 10, in which:

the controller further comprises an address code generator for generating and adding an address code to said status signals corresponding to said transceiver from which said interrogation signal was received; and each transceiver further comprises an address decoder for decoding said address code and indicating said status signals only if said address code corresponds to respective transceiver.

12. A system as in claim 1, in which the indicator comprises a visual display.

* * * * *